United States Patent [19]
Green et al.

[11] Patent Number: 6,140,918
[45] Date of Patent: Oct. 31, 2000

[54] LIGHT BAR HAVING MULTIPLE LEVELS AND MULTIPLE ROWS OF LIGHTS AND HAVING END EXTENSIONS

[75] Inventors: Timothy M. Green, Fenton, Mo.; John H. Loudenslager, Phoenix, Ariz.; Andrew G. Smith, Chesterfield; Edward F. Ryan, St. Louis, both of Mo.

[73] Assignee: Code 3, Inc., St. Louis, Mo.

[21] Appl. No.: 09/172,417

[22] Filed: Oct. 14, 1998

Related U.S. Application Data

[60] Provisional application No. 60/094,963, Jul. 31, 1998.

[51] Int. Cl.$^7$ ...................................................... B60Q 1/26
[52] U.S. Cl. .......................... 340/468; 340/471; 340/472; 340/332; 362/493; 362/487
[58] Field of Search ..................................... 340/468, 471, 340/472, 332; 362/459, 493, 487

[56] References Cited

U.S. PATENT DOCUMENTS

| | | | |
|---|---|---|---|
| D. 153,969 | 5/1949 | Murray | D48/32 |
| D. 242,907 | 1/1977 | Blaylock et al. | D10/121 |
| D. 249,250 | 9/1978 | Peirish, Jr. | D10/114 |
| D. 254,604 | 4/1980 | Gosswiller | D10/114 |
| D. 291,870 | 9/1987 | Urbanski et al. | D10/114 |
| 2,968,025 | 1/1961 | Owens | 340/125 |
| 3,789,358 | 1/1974 | Ellis | 340/87 |
| 4,189,709 | 2/1980 | Gosswiller | 340/84 |
| 4,224,599 | 9/1980 | Peirish, Jr. et al. | 340/84 |
| 4,357,595 | 11/1982 | Gosswiller | 340/81 R |
| 4,543,622 | 9/1985 | Menke et al. | 362/219 |
| 4,831,357 | 5/1989 | Miller | 340/472 |
| 5,091,828 | 2/1992 | Jincks et al. | 362/35 |
| 5,097,397 | 3/1992 | Stanuch et al. | 362/74 |
| 5,140,304 | 8/1992 | Miller | 340/472 |
| 5,296,840 | 3/1994 | Gieffers | 340/474 |
| 5,884,997 | 3/1999 | Stanuch et al. | 362/493 |

FOREIGN PATENT DOCUMENTS

| | | | |
|---|---|---|---|
| 850735 | 10/1992 | Japan | 6/49 |
| 850736 | 10/1992 | Japan | 6/49 |
| 850737 | 10/1992 | Japan | 6/49 |
| 864872 | 3/1993 | Japan | 6/49 |
| 937582 | 10/1995 | Japan | 6/49 |

OTHER PUBLICATIONS

Federal Signal Corporation, "Vista™ Strobe LightBar," product brochure, 1995, 4 pages.
Whelen Engineering, "Edge® Series Lightbars," product brochure, undated, 2 pages.
Whelen Engineering, "PierceAlert™," product brochure, 1996, 1 pages.
Transportation Safety Devices, Inc., "Mini Stealth," product brochure and advertisement, circa Mar./Apr. 1993, 2 pages.

*Primary Examiner*—Daryl Pope
*Attorney, Agent, or Firm*—Senniger, Powers, Leavitt & Roedel

[57] ABSTRACT

A light bar for mounting on an emergency vehicle to provide warning light signals. An elongate body portion has an elongate axis, the elongate body portion adapted to be mounted on the emergency vehicle so that the elongate axis traverses an axis coaxial with the direction of the travel of the emergency vehicle. At least three vertically spaced lighting layers are provided, each layer having at least one emergency light source, the emergency light sources on each layer cooperating to provide a transient high intensity warning light signal 360° around the light bar. At least four linear rows of emergency light sources as viewed from the top of the light bar are also provided, the rows being substantially parallel to the elongate axis, each row having at least two emergency light sources, at least one row located in each of the layers and at least one layer having at least two rows, the emergency light sources in each row cooperate to provide a transient high intensity warning signal 360° around the light bar. Each end of the body has projecting extensions which have a recess for accommodating mounting hardware. A spot light or other device may be nested in the bar. The fixtures may be stacked and may be positioned off center when the vehicle is in a fend off position. The fixtures may also be aimed to cross over each other or operate in response to vehicle speed.

37 Claims, 18 Drawing Sheets

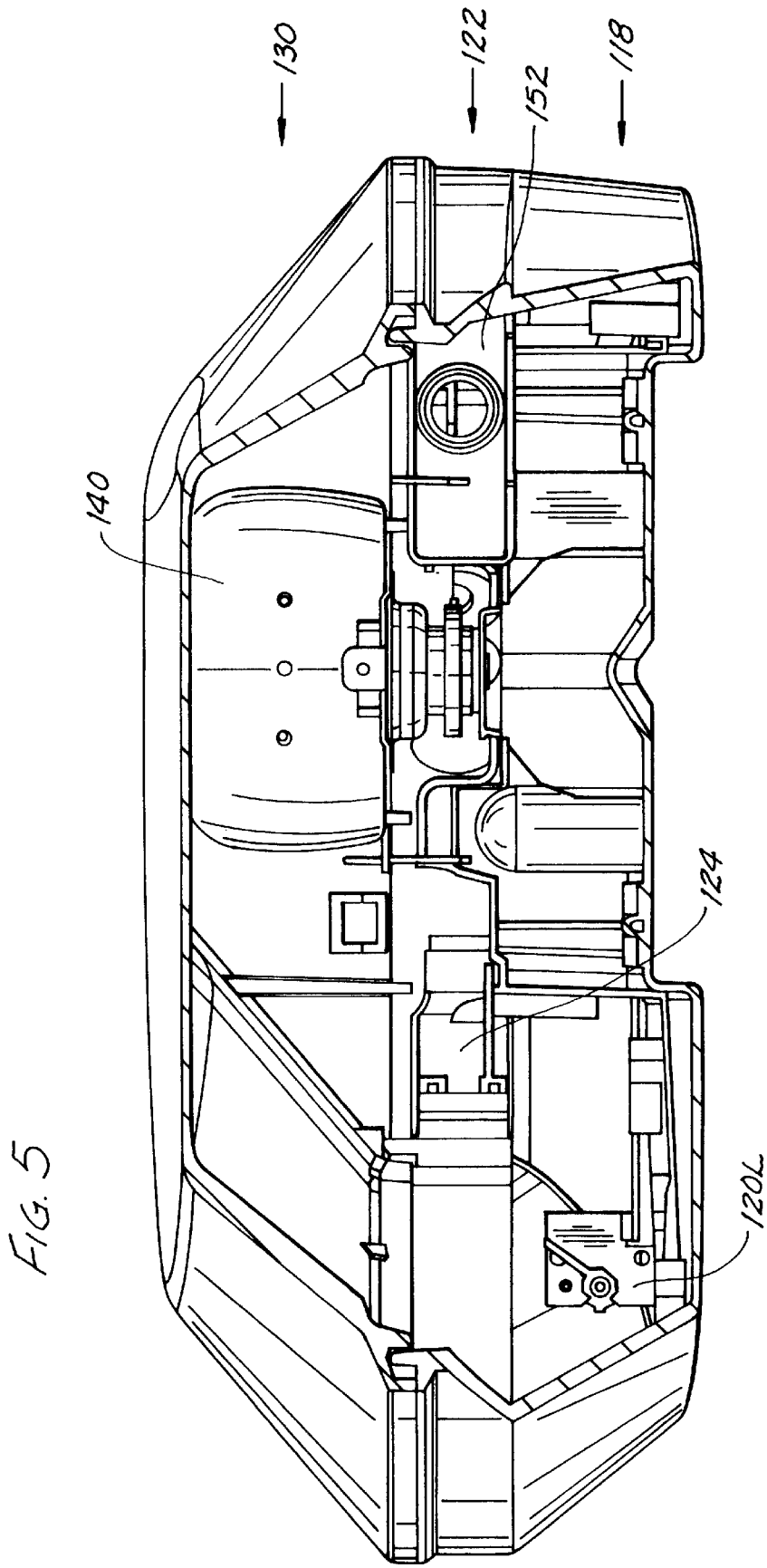

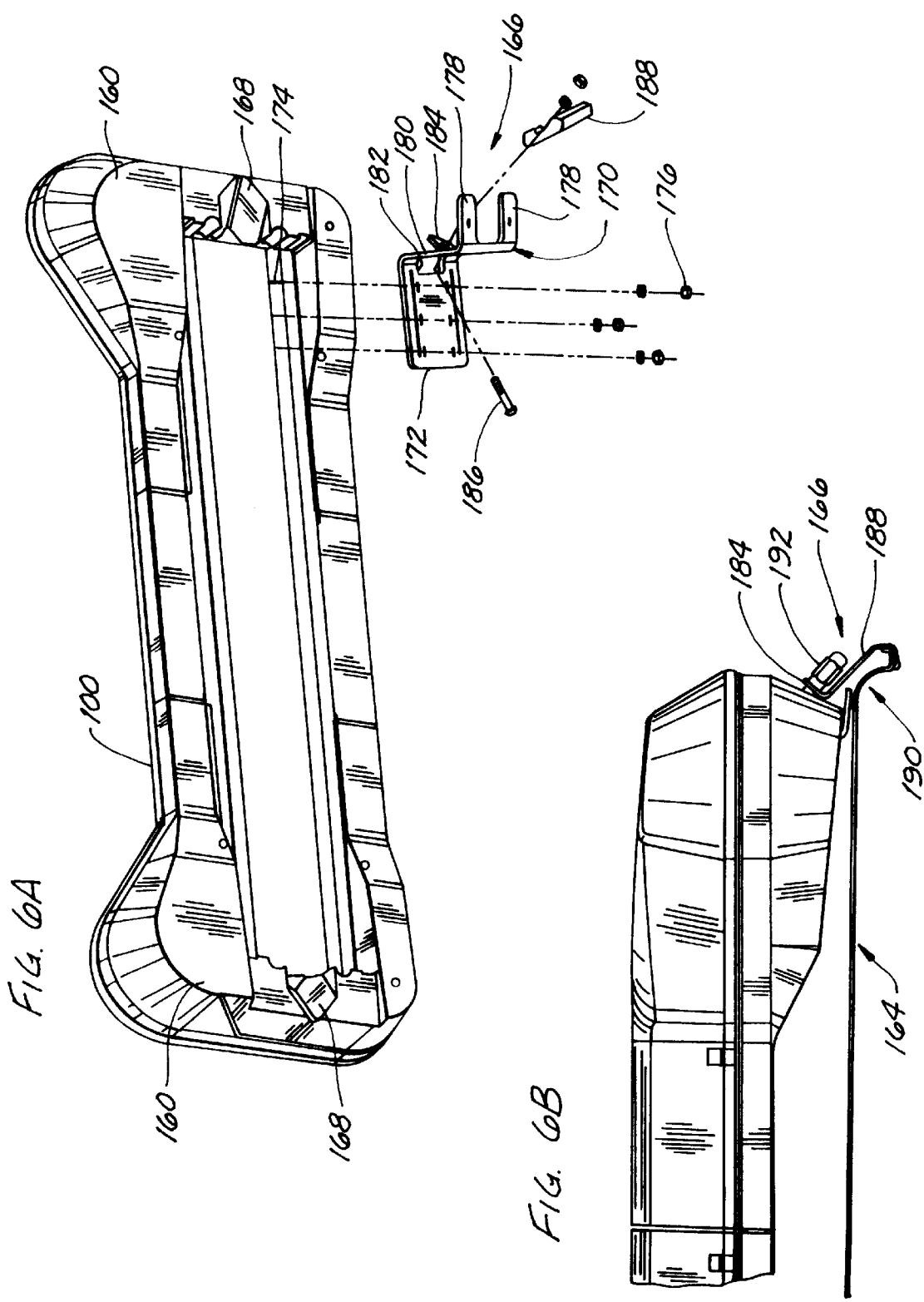

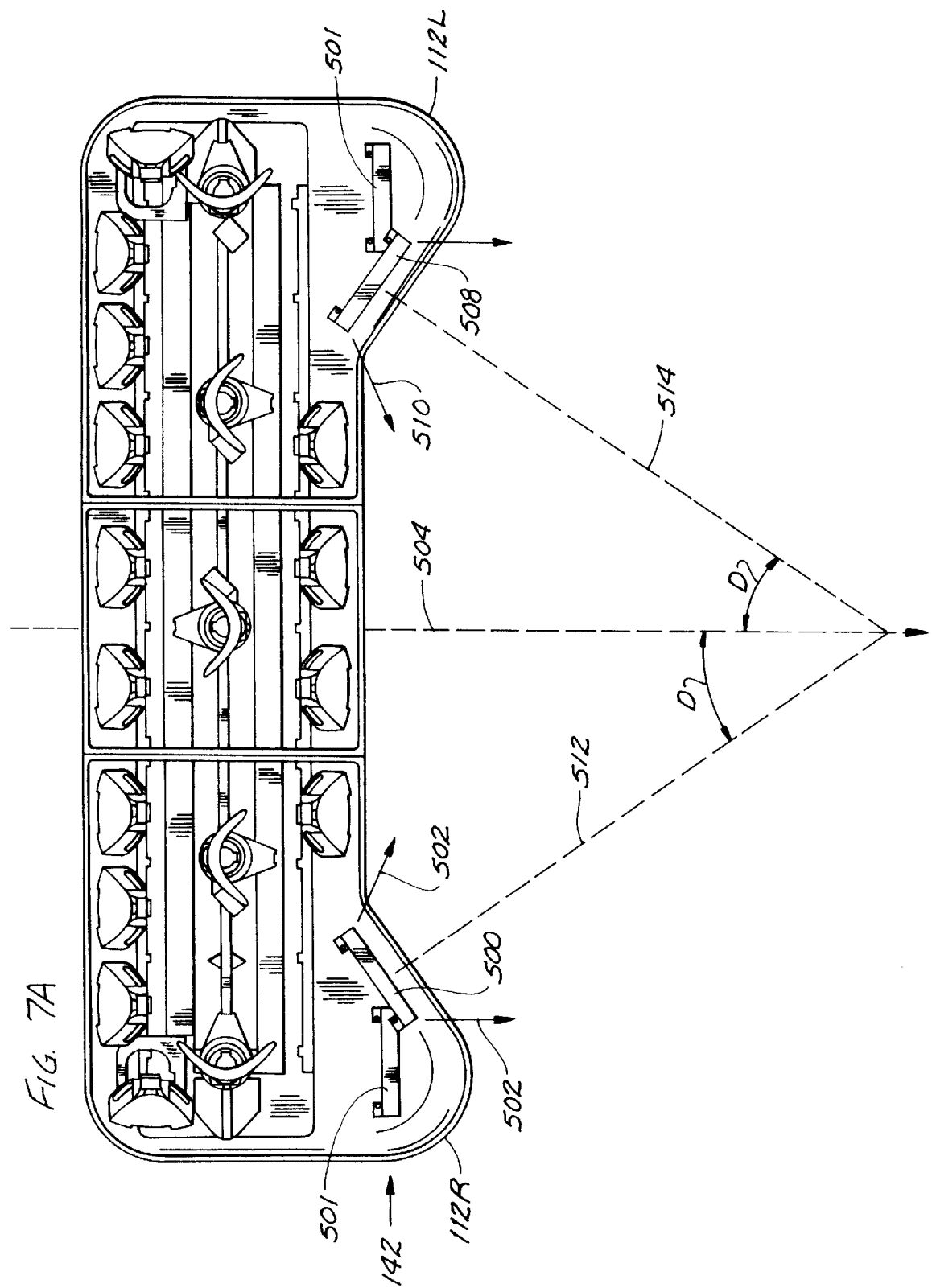

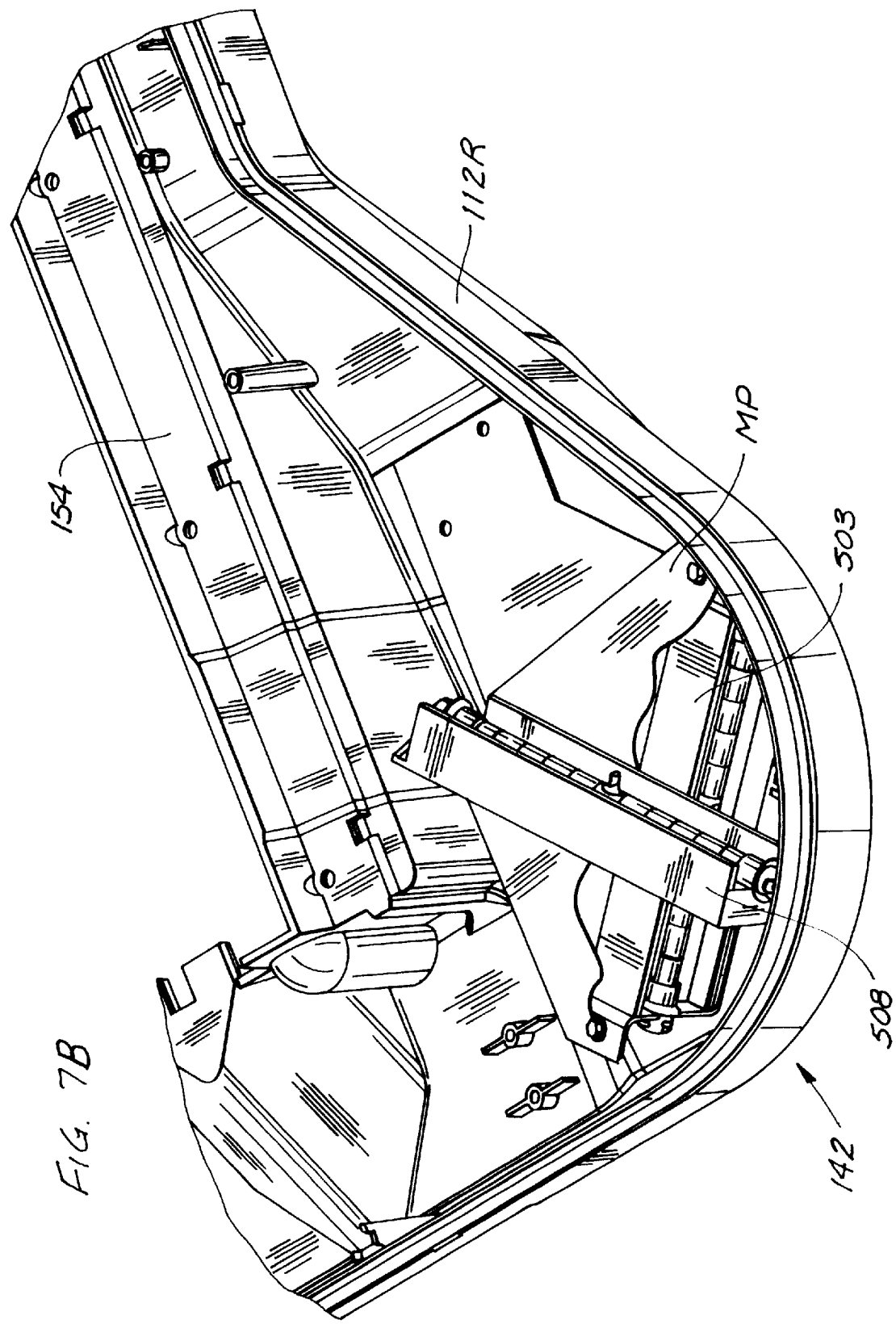

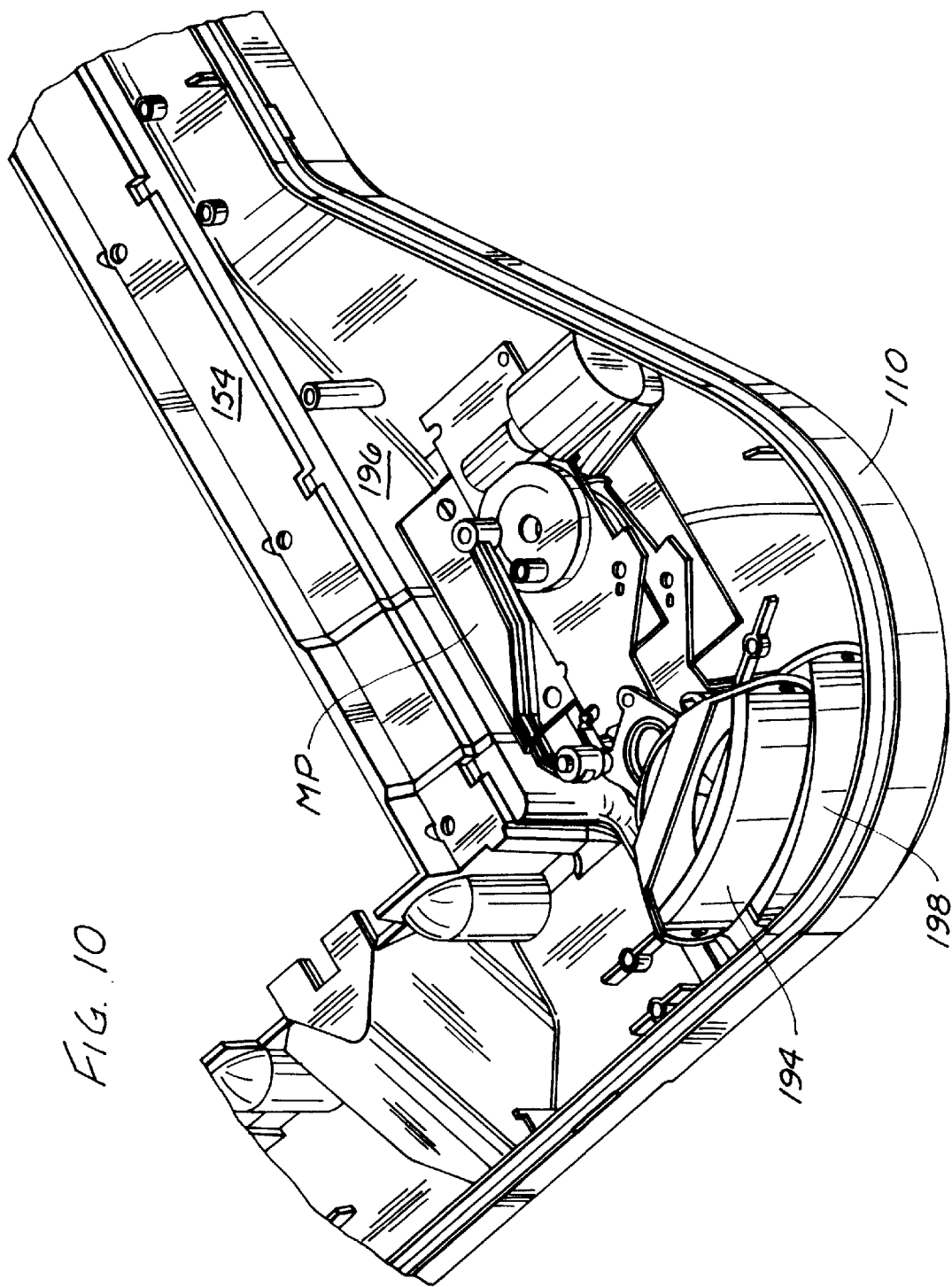

LIGHT BAR HAVING MULTIPLE LEVELS AND MULTIPLE ROWS OF LIGHTS AND HAVING END EXTENSIONS

This application claims benefit of U.S. Provisional Application No. 60/094,963 filed Jul. 31, 1998.

FIELD OF THE INVENTION

This invention relates to light bars for mounting on emergency vehicles to increase their visibility, and in particular, a multi-dimensional light bar providing multiple levels of emergency signals in substantially all directions.

BACKGROUND OF THE INVENTION

Signal lights of the type used on emergency vehicles such as police cars, fire trucks, ambulances, and wreckers, have progressed from simple dome lights to elaborate light bars which include a variety of types of signals and special purpose lights. These light bars are capable of producing a variety of light signals in various colors and patterns, each such signal having a particular purpose or significance. These light bars include many varieties of stationary, rotating, and oscillating lights.

A particular problem with existing light bars has been protecting the various light devices from the elements. Water, dirt, and road salt leaking into the light bar can damage the components. In addition, another problem has been the need for flexibility in mounting various emergency light sources within the light bar. At times, these two problems compete with each other and require compromises in light bar design. There is a need for a multi-dimension light bar having a weather-resistant enclosure including multiple levels of emergency light sources and including multiple rows of emergency light sources, which levels and rows include fixtures which can be flexibly mounted in various configurations to provide full coverage in all directions.

SUMMARY OF THE INVENTION

It is among the objects of this invention to provide a light bar with at least three lighting layers and at least four rows of emergency light sources; and to provide such a light bar in which each layer can provide 360° of primary signal light coverage. It is also among the objects of this invention to provide a light bar which provides substantial emergency signals at 10–80° angles and to the side of the light bar in order to alert observers at intersections.

It is another object of the invention to provide such a light bar that can be easily and quickly mounted on various emergency vehicle surfaces without the need for substantial reconfiguration of the light bar or its mounting hardware.

It is also among the objects of the present invention to provide such a light bar that can accommodate other devices nested within the light bar so that the flexibility of the light bar permits spotlights, radar detector antennas and/or other devices to be nested within the light bar.

It is also among the objects of the present invention to provide a light bar which aims lights toward the direction of flow of traffic when the emergency vehicle is parked in a fend off or angular position with respect to the direction of travel of the vehicle traffic.

It is also among the objects of this invention to provide such a light bar which can accommodate light sources such as strobes or halogen lights having zones which cross over and overlap to provide multiple emergency signals to an observer.

It is also an object of the present invention to provide a light bar which has patterns or modes which vary dependent upon the speed of the vehicle on which the light bar is mounted.

In one form, the invention comprises a light bar for mounting on an emergency vehicle to provide warning light signals. An elongate body portion having an elongate axis is adapted to be mounted on the emergency vehicle so that the elongate axis traverses an axis coaxial with the direction of the travel of the emergency vehicle. At least three vertically spaced lighting layers are provided, each layer having at least one emergency light source, the emergency light sources on each layer cooperating to provide a transient high intensity warning light signal 360° around the light bar. In addition, at least four linear rows of emergency light sources as viewed from the top of the light bar are provided. The rows are substantially parallel to the elongate axis, each row having at least two emergency light sources, at least one row located in each of the layers and at least one layer having at least two rows, the emergency light sources in each row cooperate to provide a transient high intensity warning signal 360° around the light bar.

The light bar may further include first and second forwardly or rearwardly projecting extensions on each end of the elongate body portion so that at least three of the rows are located within the elongate body portion and at least one of the rows are located within the extensions.

The light bar may also include a base portion which extends downwardly from each end of the elongate body portions so that the base portion is adapted to support the elongate body portion on the vehicle. Two mounting devices, one at each end of the elongate body portion, are adapted to interconnect the light bar and the emergency vehicle, each base portion having a recess within which each of the mounting devices is positioned.

The light bar may also include at least two vertically spaced lighting layers, each layer having at least one rotating or oscillating emergency light source, the rotating or oscillating emergency light source of one layer being immediately above the rotating or oscillating emergency light source of the other layer.

The light bar may further include a retractable device nested within the elongate body portion. The device may be a spot light which rotates about a vertical axis to provide a beam of light which illuminates positions to the right, in front of, to the left or behind the vehicle and/or a spot light which rotates about a horizontal axis to provide a beam of light which illuminates various horizontal positions.

The light bar may also include a first rotating or oscillating light source having a device for selectively positioning the first light source at a fixed position to provide a beam of light at an angle of about 5° to 85°, and preferably at least 45° and not more than 75°, with the elongate axis whereby the first light source in the fixed position is selectively positioned in a fend off position to illuminate a roadway when the emergency vehicle is at a fend off angle relative to the roadway.

The light bar may additionally include a first transient light source having a first mode in which the first light source rotates or oscillates and having a second mode in which the first light source is selectively positioned at a fixed position. A second transient light source is also provided having a first mode in which the second light source rotates or oscillates and having a second mode in which the second light source is selectively positioned at a fixed position. A single controller controls operation and coordinates modes of operation of the first and second light sources.

The light bar may further include a first light source having a first zone of illumination, the first source positioned on a left side of a central axis of the light bar so that the first zone illuminates positions on the right side of the light bar. In addition, a second light source having a second zone of illumination is provided, the second source positioned on a right side of the central axis of the light bar so that the second zone illuminates positions on the left side of the vehicle.

The light bar may also include three light sources. The first light source has a first zone of illumination, the first source positioned on a left side of the central axis of the light bar so that the first zone illuminates positions on the right side of the light bar. The second light source has a second zone of illumination, the second source positioned contiguous to and perpendicular to the first light source so that the second zone illuminates positions on the left side of the light bar. The third light source has a third zone of illumination, the third source positioned contiguous to and perpendicular to the second light source, the third source positioned opposite to and parallel to the first light source, the third light source positioned so that the third zone illuminates positions on the left side of the light bar.

The light bar may also include a control responsive to and receiving a status signal indicating a status of the vehicle, the control controlling the number of operating emergency light sources, the light pattern, the flashing rate or the position (e.g. fend off) generated by the operating emergency light sources as a function of the status of the vehicle as represented by the received status signal. The status of the vehicle may be speed, acceleration, brake position or braking rate, turn signal position or transmission position. In such cases, the status signal would be speed signal, an acceleration signal, a signal indicating brake position or braking rate, a signal indicating the turn signal switch position or a signal indicating the gear of the transmission, respectively.

Other objects and features will be in part apparent and in part pointed out hereinafter.

BRIEF DESCRIPTION OF THE DRAWINGS

FIG. 5 is a transverse cross section taken along lines 5—5 of FIG. 2.

FIG. 6A is an exploded view of one preferred embodiment of the mounting hardware of the invention in combination with the light bar of the invention.

FIG. 6B is a partial front plan view of a light bar according to the invention mounted to a vehicle.

FIG. 7A is a top plan view in schematic of one preferred embodiment of a light bar according to the invention showing crossover strobes mounted within each of the longitudinal, forwardly projecting extensions.

FIG. 7B is a perspective view in schematic of another preferred embodiment of a light bar according to the invention showing crossover strobes mounted within the right longitudinal, forwardly projecting extension.

FIG. 10 is a perspective view of two stacked oscillating lights mounted to the frame of the light bar of the invention.

Corresponding reference characters indicate corresponding parts throughout the drawings.

DETAILED DESCRIPTION OF THE PREFERRED EMBODIMENTS

Figure 1:
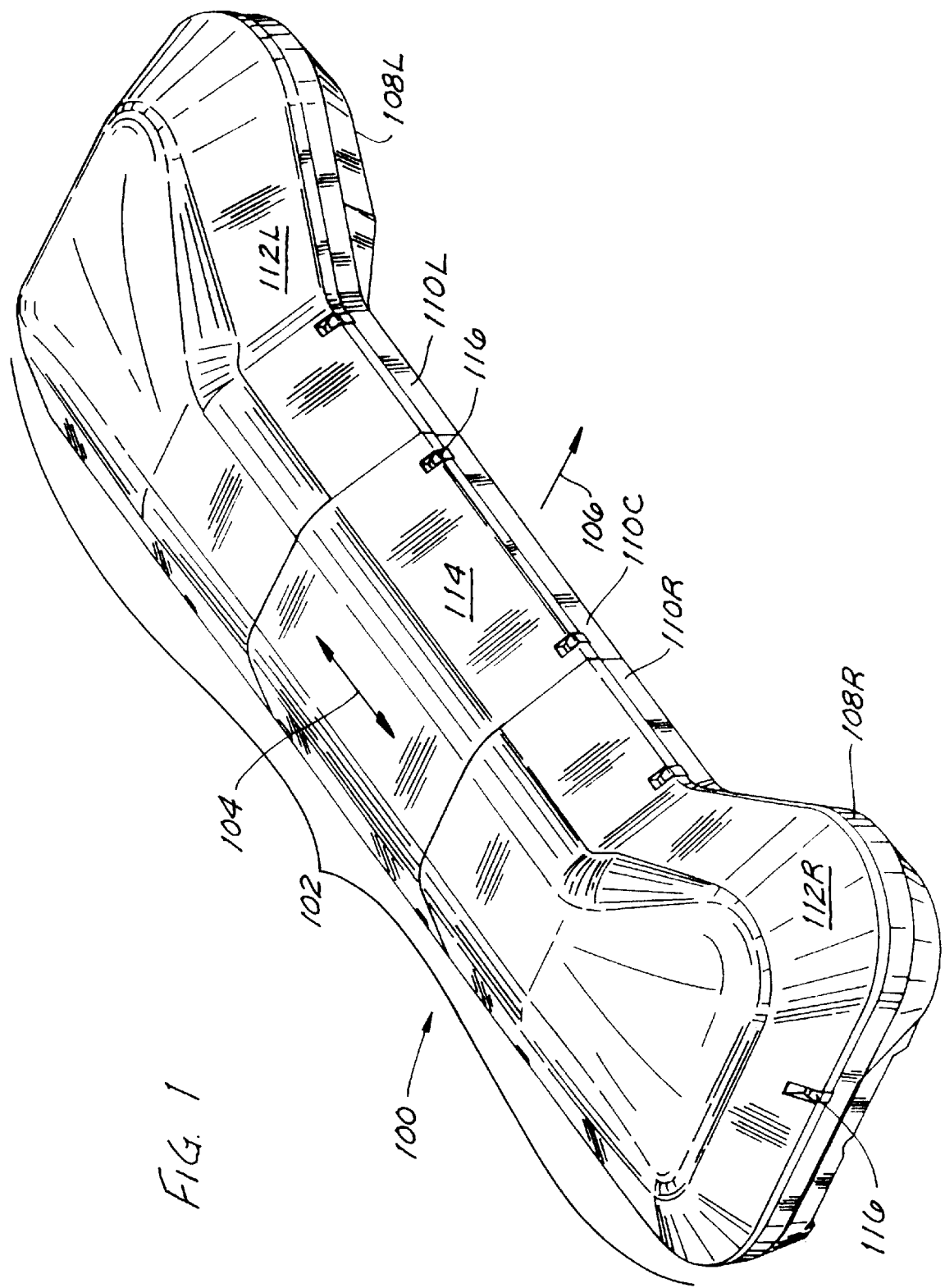
FIG. 1 is a perspective view of one preferred embodiment of a light bar according to the invention showing only the lens portion.

Referring to FIG. 1, a perspective view of one preferred embodiment of a light bar 100 according to the invention is illustrated. For simplicity, FIG. 1 illustrates only the outer lens portion of the light bar 100. It is contemplated that the lenses would be transparent and having either a clear, red or blue color through which the light sources within the bar would transmit light. As will be described below, the light bar 100 is intended for mounting on an emergency vehicle (not shown) to provide warning light signals to observers positioned around the vehicle either as pedestrians or in other vehicles.

In general, the light bar 100 includes an elongate body portion 102 having an elongate axis 104. The bar 100 is adapted to be mounted on the emergency vehicle so that the axis 104 is transverse to the direction of travel of the emergency vehicle as generally indicated by arrow 106. Each end of the elongate body portion 102 terminates in a projection 108L, 108R. As illustrated in FIG. 1, the projections 108 extend forwardly in the direction of travel of the emergency vehicle as indicated by arrow 106. However, it is also contemplated that the projections 108 may extend rearwardly or both forwardly and rearwardly.

The lens body of the light bar 100 includes three compartments mounted on a frame, each defined by an upper and lower mating lens. The lower portion of the lens body includes lower end lenses 110L, 110R which are mirror images of each other separated by a lower central lens 110C. The upper lens portion of the light bar 100 includes upper end lenses 112L, 112R which are mirror images of each other separated by an upper central lens 114. As is known in the art, each compartment is formed by upper and lower lens sections which are joined together by latches 116 such as illustrated in co-assigned U.S. Pat. No. 5,091,828, the entire disclosure of which is incorporated herein by reference in its entirety. Preferably, the edges of the upper and lower lenses interfit and have a gasket disposed therebetween to form a watertight compartment.

Figure 2:
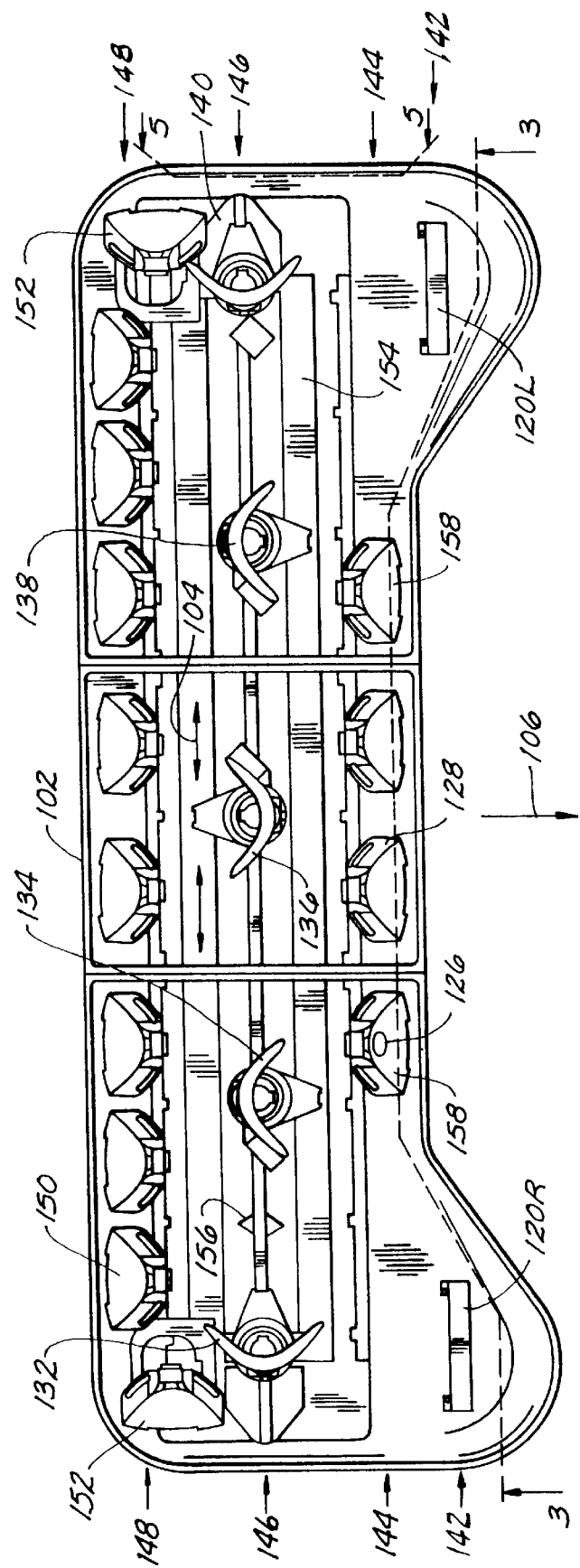
FIG. 2 is a top plan view of one preferred embodiment of a light bar according to the invention with the top lenses removed showing four (4) rows of lights.
Figure 3:
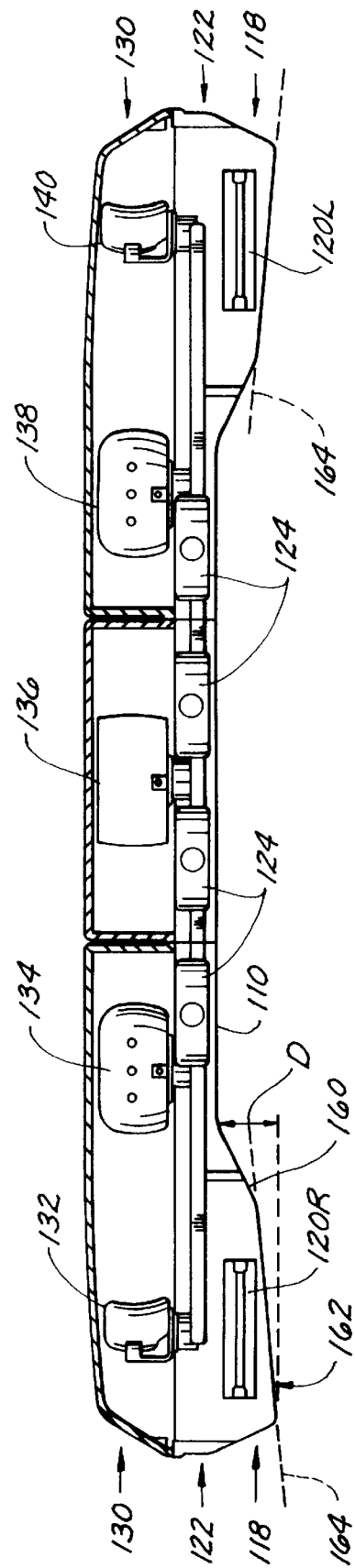
FIG. 3 is a view taken along lines 3—3 of FIG. 2 including the top lens in cross section.

Referring now to FIGS. 2 and 3, the three vertical levels and four vertical rows of emergency light sources can be seen. As noted above, the elongate body portion 102 extends along axis 104 and is adapted to be mounted on the emergency vehicle so that the axis 104 traverses or intersects the axis 106 which is coaxial with the direction of travel of the emergency vehicle. As shown in FIG. 3, which is a front view of longitudinal cross-section of the light bar 100 taken along line 3—3 of FIG. 2, the light bar 100 includes at least three vertically-spaced lighting layers. In particular, the light bar 100 includes a lower lighting layer 118 having light fixtures such as strobe lights 120L, 120R. The light bar 100 also includes an intermediate lighting layer 122 having light fixtures such as a plurality of take-down lights 124, each of which includes a light source 126 and a parabolic reflector 128 as illustrated in FIG. 2. In addition, the light bar 100 includes an upper lighting layer 130 having light fixtures such as rotating lights 132. The rotating lights 132 may rotate partially in a back-and-forth, or oscillating, motion or may rotate 360° in either direction. As used herein, rotation includes oscillation and visa versa. As a result, each lighting layer 118, 122 and 130, has a light fixture constituting at least one emergency light source.

Furthermore, it is contemplated that the emergency light sources on each layer cooperate together to provide a transient high intensity warning light signal to observers located anywhere within the 360° perimeter around the light bar 100. For example, as shown in FIGS. 2 and 3, strobes 120 and take-down lights 124 illuminate the front sector of the light bar 100. In one preferred embodiment, rotating lights 132 and 140 may be 360° rotating light fixtures. These lights would illuminate the side sectors of the light bar as well as other sectors of the light bar. In addition, lights 134 and 138 may be forward oscillating fixtures to illuminate the front and side sectors of the light bar 100, assuming they would oscillate at approximately 180°. Finally, the center light 136 may be a rear oscillating fixture to illuminate the rear sector of light bar 100.

It is also noted that there is a rear set of fixtures (described below) located in intermediate lighting layer 122 which are shown in FIG. 2 and which illuminate the rear sector of the light bar 100. In addition, it is also noted that there are rear corner fixtures 152 (not shown in FIG. 3) located in intermediate lighting layer 122 which illuminate the side and rear sectors of the light bar 100.

As illustrated in FIG. 2, the light bar 100 also includes at least four linear rows of emergency light sources as viewed from the top of the light bar. In particular, the light bar 100 includes a front row 142, a front-center row 144, a rear-center row 146, and a rear row 148. Each row is substantially parallel to the elongate axis 104 of the light bar 100. Furthermore, each row has at least two fixtures constituting the emergency light sources. For example, the front row 142 may include fixtures such as strobes 120. The front-center 144 may include fixtures such as take-down lights 124. The rear-center row 146 may include fixtures such as rotating lights 132–140. The rear row 148 may include fixtures such as stationary reflector units 150 which form an array to provide directional lighting to observers in the rear and side sectors of the light bar 100.

The rows and layers of emergency lighting of the light bar 100 according to the invention are interrelated in the following manner. There is at least one row located in each of the lighting layers. For example, as shown in FIGS. 2 and 3, lower lighting layer 118 includes front row 142, intermediate lighting layer 122 includes the front-center row 144 and the rear row 148 and upper lighting layer 130 includes rear-center row 146.

It is also contemplated that at least one of the lighting layers have at least two rows of fixtures constituting emergency light sources located therein. As illustrated in FIGS. 2 and 3, intermediate lighting layer 122 includes two rows, i.e., the front-center row 144 and the rear row 148.

Referring again to FIG. 2, the emergency light sources in each row cooperate to provide a transient high intensity warning signal 360° around the light bar 100. For example, observers in the front and side sectors of the light bar 100 are illuminated with transient lighting by the rotation of fixtures 132 and 140, by the forward oscillation of oscillators 134 and 138 and by the rearward oscillation of oscillating fixture 136.

Preferably, the emergency light sources in each row cooperate to provide a transient high intensity warning signal to an observer positioned substantially in line with the rows such as observers in either side sector of the light bar 100. For example, rear corner oscillators (not shown) could be mounted in the intermediate lighting layer 122 and substantially within the rear row 148 to illuminate observers in the side sectors. In addition, the rotators 132 and 140 in the rear-center row 146 also illuminate the side sectors. Optionally, alley lights 152 may be mounted in the intermediate lighting layer 122 and in rear row 148 to provide additional side sector emergency signals. Finally, the strobes 120L, 120R may be replaced by oscillating or rotating light fixtures which could also provide side sector illumination. If both these latter optional features were implemented in the light bar of FIG. 2, all four rows would provide a transient high intensity warning signal to an observer positioned substantially in line with each of the rows.

Figure 4:
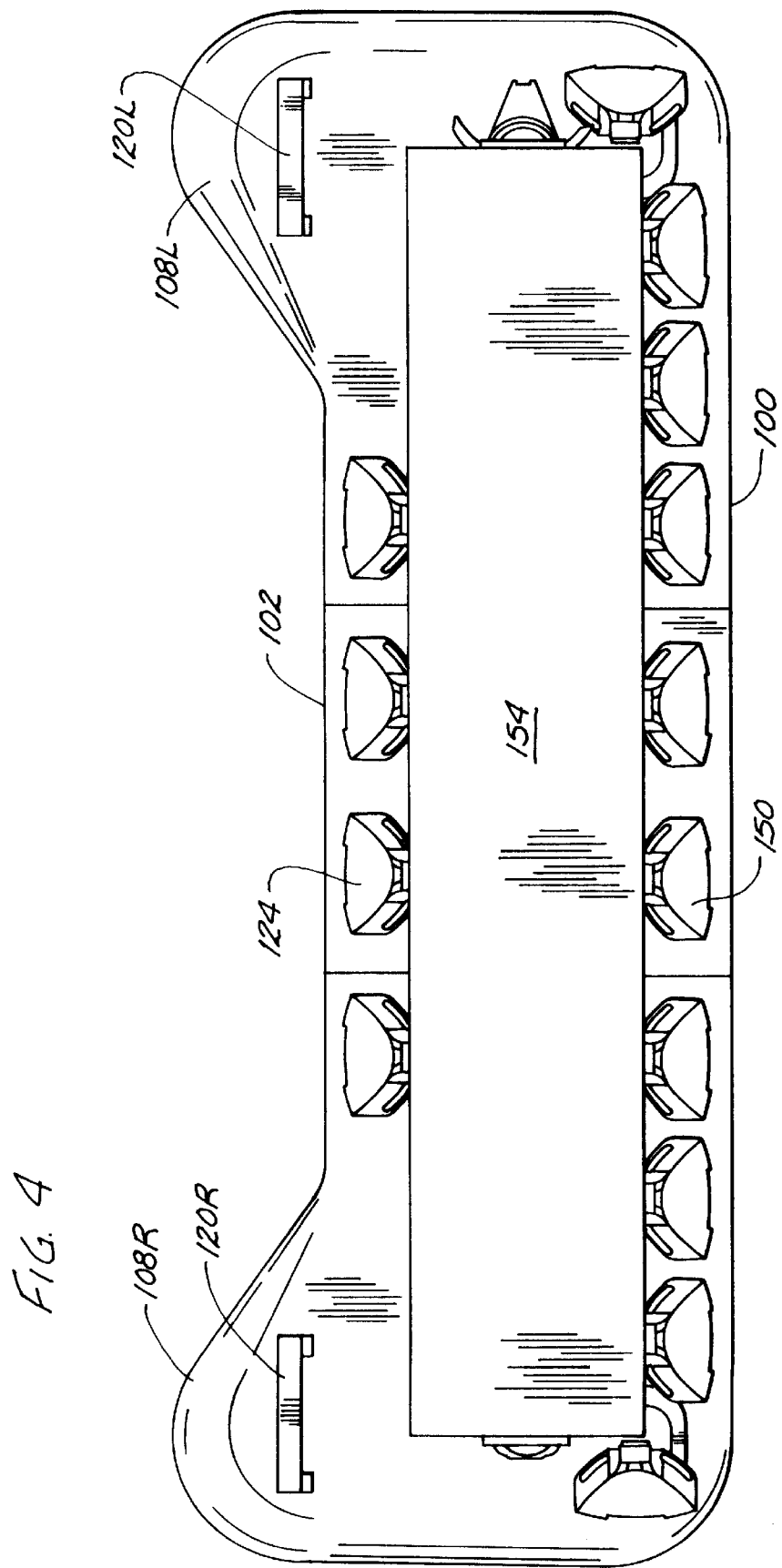
FIG. 4 is a bottom plan view of one preferred embodiment of a light bar according to the invention.

As best shown in FIGS. 2 and 4, the light bar 100 includes a substantially horizontal support in the form of a hollow tubular frame 154 extending substantially the length of the light bar 100 which includes the length of the elongate body portion 102, extending substantially from the driver side end to the passenger side end. This hollow tubular frame 154 is similar to the hollow tube illustrated in U.S. Pat. No. 5,091,828. Frame 154 supports each of the lower lenses and the upper lenses are attached to the lower lenses by latches 116 (FIG. 1). Optionally, frame 154 may support each of the emergency light sources in each of the rows and in each of the layers. In particular, the hollow tubular frame 154 may be provided with flanges and/or a bottom section and/or mounting plates which define an intermediate layer and supporting the emergency light sources in the intermediate and lower layers 118, 122, and flanges and/or a top section defining an upper layer above the intermediate layer and supporting the emergency light sources in the upper layer 130.

One reason that the light bar 100 is able to accommodate three lighting layers 118, 122 and 130 rather than two (as in the light bar of U.S. Pat. No. 5,091,828) is that the projecting extensions 108 extend downward below a horizontal plane defined by the hollow tube frame 154. As illustrated in FIG. 3, as well as projecting forwardly, a lower portion of projecting extensions 108 extends downward by a distance D which essentially defines the lower lighting layer 118. This lower portion accommodates the fixtures such as strobe 120, and other stationary halogen devices or oscillating lights. Consequently, the lower portion of each projecting extension 108 serves a dual purpose of projecting downwardly to provide space to define a third layer of lighting and projecting downwardly to provide a base portion 160 described below which supports the elongate body portion 102 and the light bar 100 on the vehicle.

In one preferred embodiment of the invention, each level 118, 122, 130 has at least one transient (rotating or oscillating) emergency light and at least one level has at least one mirror positioned adjacent a rotating emergency light fixture to reflect light beams generated by the rotating emergency light fixtures. For example, diamond-shaped mirror 156 may be located in upper lighting layer 130 and in rear-center row 146 to reflect light provided by rotator 132 and oscillator 134. Furthermore, it is contemplated that the front most row of each layer may include at least one filter for filtering the light beams provided by that row and creating a multi-color pattern produced by the light bar 100. In general, at least one of the rows of at least one layer would include a filter so that, in FIG. 2, the front-center row 144 may include filters 158 on lights 124 to convert these take down lights in flashers for providing various emergency colored light signals.

As shown in FIG. 2, each end of the light bar 100 is illustrated as having forwardly projecting extensions 108L, 108R. It is also contemplated that these projections may be rearwardly projecting as well as forwardly projecting or that these extensions may only project rearwardly. Also, it is preferable that at least two rows are located within the elongate body portion 102 and at least two layers are located within the forwardly projecting extensions 108L and 108R. As shown in FIG. 2, front-center row 144, rear-center row 146, and rear row 148 are located within the elongate body portion 102. Furthermore, an additional row in the form of front row 142 is located only within the forwardly-projecting extensions 108L, 108R. In addition, all three layers 118, 122, 130 are located within extensions 108 and intermediate and upper layers 122, 130 are located within the elongate body portion 102. Preferably, the extensions are integral with the elongate body portion as best illustrated in FIG. 1. Lens 112L comprises a single lens section forming at least a part of the elongate body portion 102 and at least a part of the forwardly projecting left extension 108L. Similarly, right upper end lens 112R forms a single lens section which is part of the elongate body portion 102 and at least a part of the forwardly projecting right extension 108R.

In other preferred embodiments of the invention, it is also contemplated that at least one of the layers of light sources are located only within the extensions. For example, as illustrated in FIG. 3, lower lighting layer 118 is located only within the forwardly-projecting extensions 108L, 108R.

One aspect of the invention which accommodates the lower lighting layer and improves the aerodynamics of the light bar 100 is best appreciated by referring to FIG. 3. The lower lens 110 includes an integral base portion 160 which extends downwardly a distance D from each end of the elongate body portion 102. The base portion 160 is adapted to support the elongate body portion 102 and the light bar 100 on the vehicle. In particular, the base portion 160 forms a substantially flat surface 162 which engages the vehicle surface. The surface 162 is slightly angled so that it will conveniently and easily mate with most curved surfaces on the roof of most vehicles. For example, a dashed line 164 is intended to represent the curvature of a vehicle roof and shows that the flat surface 162 conveniently rests upon the vehicle roof. Regardless of the curvature of the roof, the flat surface 162 provides at least one or two points which would conveniently rest on the roof. Alternatively, surface 162 may be convex or concave.

As best shown in FIGS. 6A and 6B, two mounting devices 166 (only one is shown), one at each end of the elongate body portion 102, are adapted to interconnect the light bar 100 and the roof 166 of the emergency vehicle. In particular, each base portion 160 is provided with a recess 168 within which each of the mounting devices 166 is positioned. The mounting devices 166 are adapted to engage the hollow tubular frame 154 and engage the vehicle gutter such that the light bar 100 can be mounted on the vehicle's surface regardless of the contour of the vehicle roof 164. As shown in FIGS. 6A and 6B, the mounting device 166 includes a mounting bracket 170 having a horizontal plate portion 172 for engaging the frame 154 via bolts 174 and nuts 176. From a front view in a vertical cross-section, the bracket 170 has a somewhat S-shape which includes the upper horizontal plate portion 172, two lower pads or feet 178 and a substantially vertical web 180 interconnecting the plate portion and feet. Preferably, the feet 178 are cushioned by pads (not shown) and positioned on a curved portion of the vehicle roof 164. The web 180 includes a cutaway 182 which provides clearance for a tab 184 having an opening therein through which a carriage bolt 186 is positioned. The bolt engages a gutter hook 188 which is adapted to engage the gutter 190 of the vehicle. A trim nut holds the gutter hook 190 on the carriage bolt 186.

In another aspect of a preferred embodiment of the invention, it is contemplated that at least two of three vertical lighting layers 118, 122, 130 may each have at least one oscillating or rotating emergency light source. As shown in FIG. 10 in perspective, an oscillating emergency light fixture 194 is attached to an intermediate flange 196 of intermediate layer 122 of frame 154 and is located and positioned immediately above an oscillating emergency light fixture 198, which is held in place in the lower level 188 by thread cutting screws engaging molded plastic receivers or bosses in the lower lens 110. In general, all fixtures except for the fixtures in the upper lighting layer 130 may be supported by the lower lenses 110 via thread cutting screws which are driven into the lower lenses 110 or brackets which engage the lower lenses 110. Alternatively, any of the fixtures may be supported by frame 154. The details of these fixtures 198 is described below with reference to FIG. 8.

Figure 15:
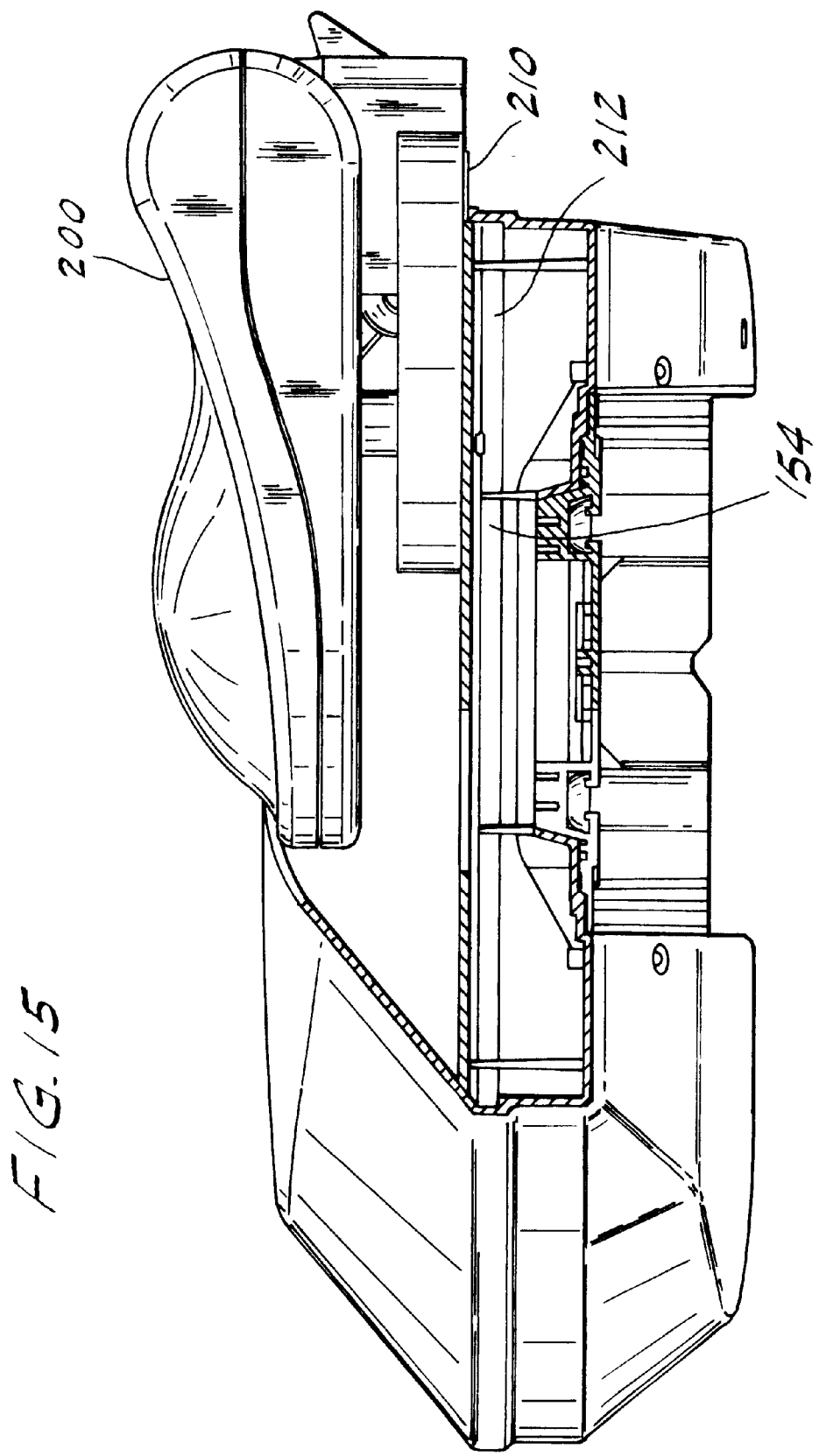
FIG. 15 is a transverse cross section taken along lines 15—15.
Figure 16:
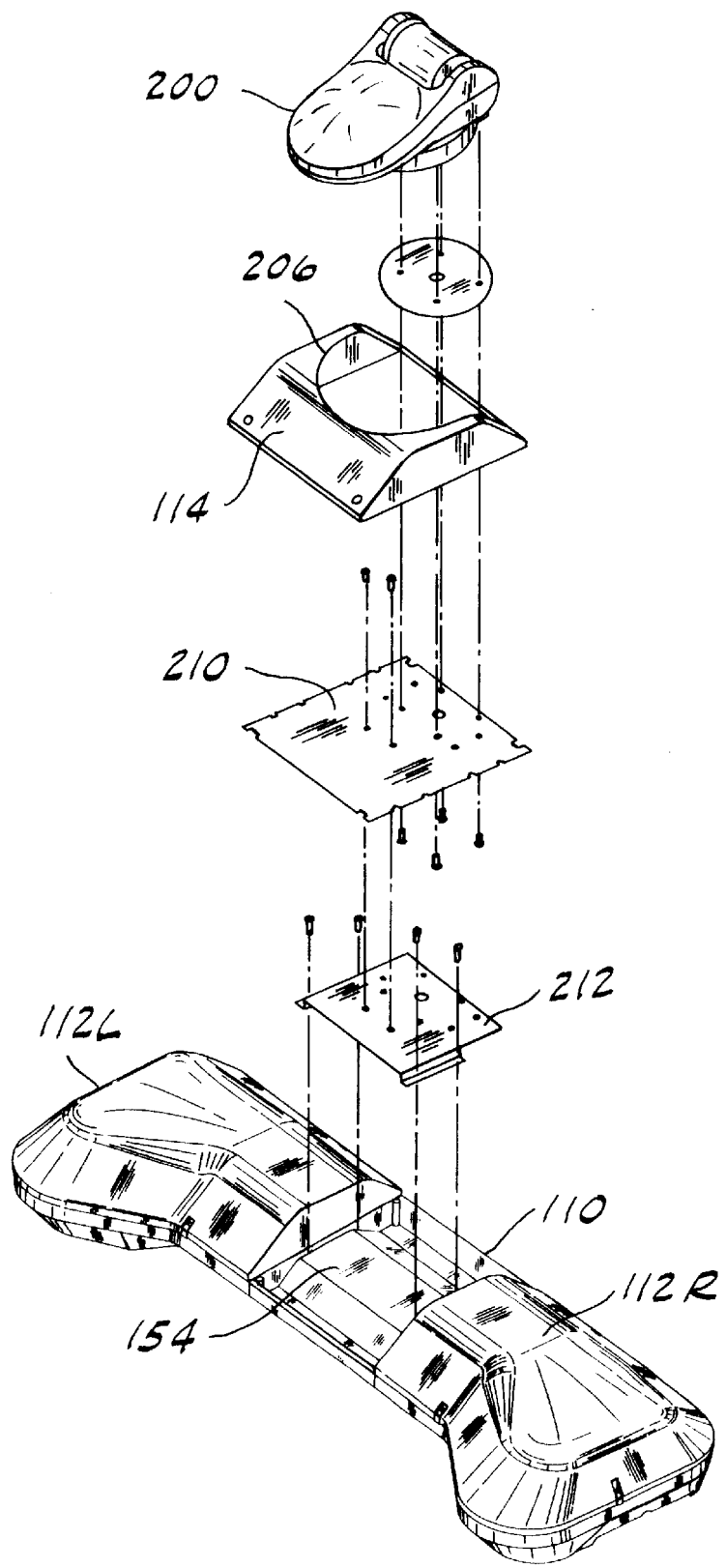
FIG. 16 is an exploded view of FIG. 14.

In another aspect of the invention as illustrated in FIGS. 13–16, it is contemplated that the light bar 100 may be provided with a retractable device nested within the elongate body portion 102. As illustrated in FIGS. 13–16, the device may comprise a spotlight 200 as described in co-assigned, co-pending application Ser. No. 09/126,801 filed Jul. 31, 1998 and co-assigned, the entire disclosure of which is incorporated herein by reference in its entirety. Preferably, the spotlight 200 rotates about a vertical axis 202 so that it provides a beam of light which illuminates positions to the side sectors as well as position to the front and rear sectors of the light bar 100. In addition, the spotlight rotates about a horizontal axis 204 to provide a beam of light which illuminates various horizontal positions in front of, to the side of, or to the rear of the vehicle. Instead of or in addition to the spotlight 200, it is contemplated that some other device which may be frequently used on an emergency vehicle, such as a radar detector antenna or an infrared source, may be nested within the light bar, preferably in the upper layer. Regardless of the particular device which is nested within the light bar 100, the upper central lens 114 is configured with a cut-out 206 to accommodate the spotlight 200. Preferably, the spotlight 200 is nested substantially within the profile of the light bar 100 as illustrated in FIG. 15. This nesting does not significantly affect the aerodynamics of the light bar 100 and provides a lower profile for the entire apparatus. In order to prevent moisture or dirt from entering the light bar 100, the cut-out upper central lens 114 is mounted to a mounting plate 210 which seals to the lower lens 110 and to the upper end lens 112. As shown in FIGS. 15 and 16, the mounting plate 210 is held in place by an adapter bracket 212.

Figure 8:
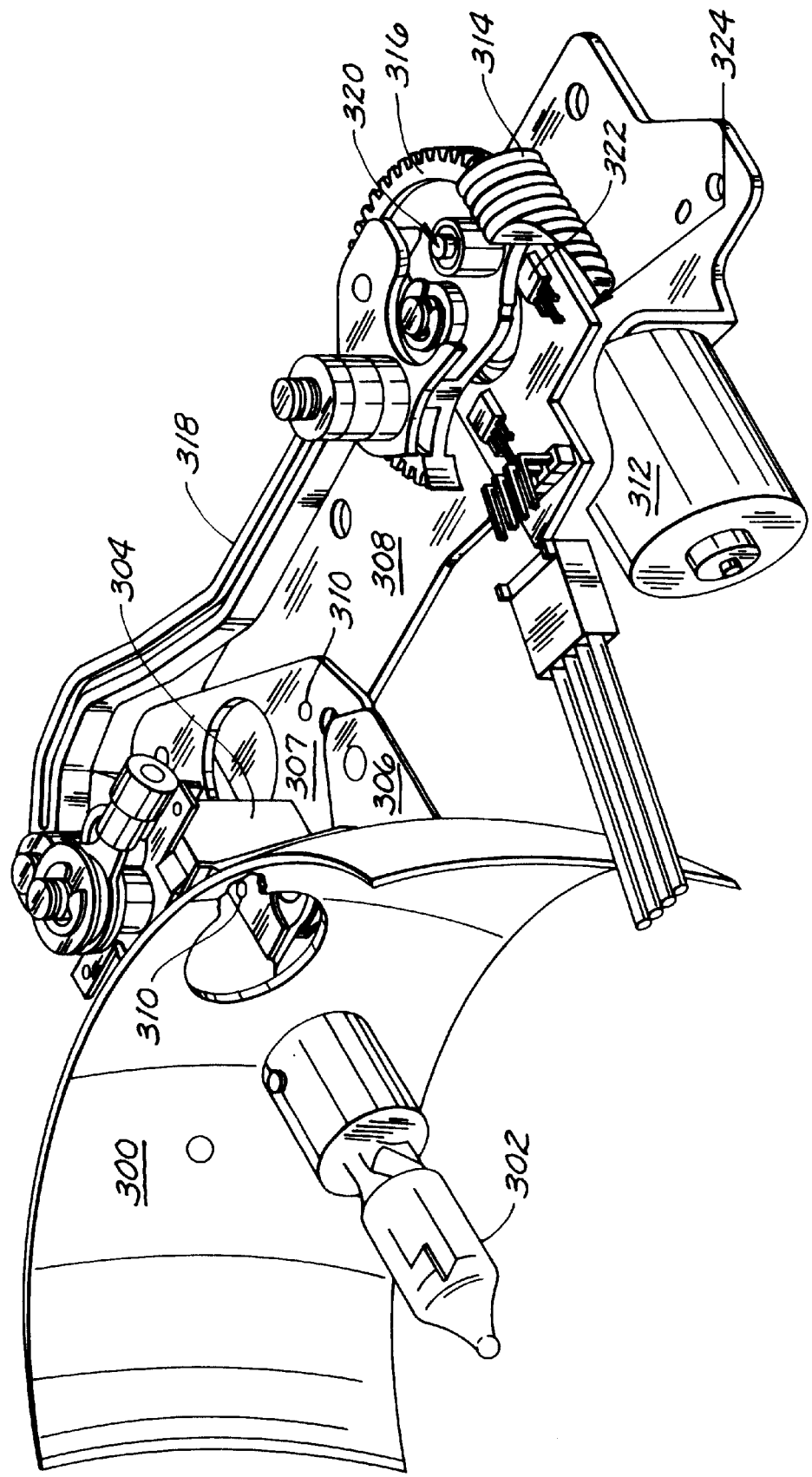
FIG. 8 is a perspective illustration of a rotating light source including skewing hardware in the form of a magnet and hall sensor.

It is contemplated that each of the oscillating light fixtures which are part of the light bar 100 may be configured as illustrated in FIG. 8 and may include a device for selectively positioning the light fixture at a fixed position. Although FIG. 8 illustrates an oscillating fixture, it is contemplated that the same device may be used in combination with a rotating fixture. The fixture includes a parabolic mirror 300 for reflecting light provided by a lamp such as bulb 302. The bulb 302 is received in a socket 304 supported to the rear of the parabolic mirror 300 by a base plate 307. The mirror 300 is affixed to or has an integral tab 306 connected to the base plate 307. A motor plate 308 supports the base plate 307 in place via a hinge pin (generally at 310) so that the base plate 307 pivots within a horizontal plane. Oscillation of the fixture occurs as follows. Motor 312 is supported on motor plate 308 and rotates a worm gear 314 which engages and rotates a disk gear 316. One side of the disk gear 316 engages a plate crank arm 318 which is also hinged to a far side of the base plate 307. As disk gear 316 rotates, it moves arm 318 back-and-forth which in turn pivots base plate 307 about the hinge pin 310 to cause the parabolic mirror 300 to oscillate.

In order to monitor the position of the fixture shown in FIG. 8, a positioning device such as a rod magnet 320 is attached to the disk gear 316 and a Hall effect sensor 322 mounted on a printed circuit board is positioned under the disk gear 316. As the disk gear rotates 316, the rod magnet 320 passes the hall effect sensor 322 with each rotation thereby indicating the position of the fixture. Preferably, the rod magnet 320 would be positioned on the disk gear 316 such that when the rod magnet 320 is directly over the hall sensors 322, the fixture would be in a desired position, such as a fend off position, at which point the motor 312 would be deenergized to discontinue oscillation and to maintain the fixture in a fixed position. When two magnets 320 and two Hall sensors 322 are used as illustrated in FIG. 8, the fixtures have multiple fixed positions and the positioning device may be part of a circuit responsive to operator input for selecting a fixed position at which the first light source is positioned.

Figure 17A:
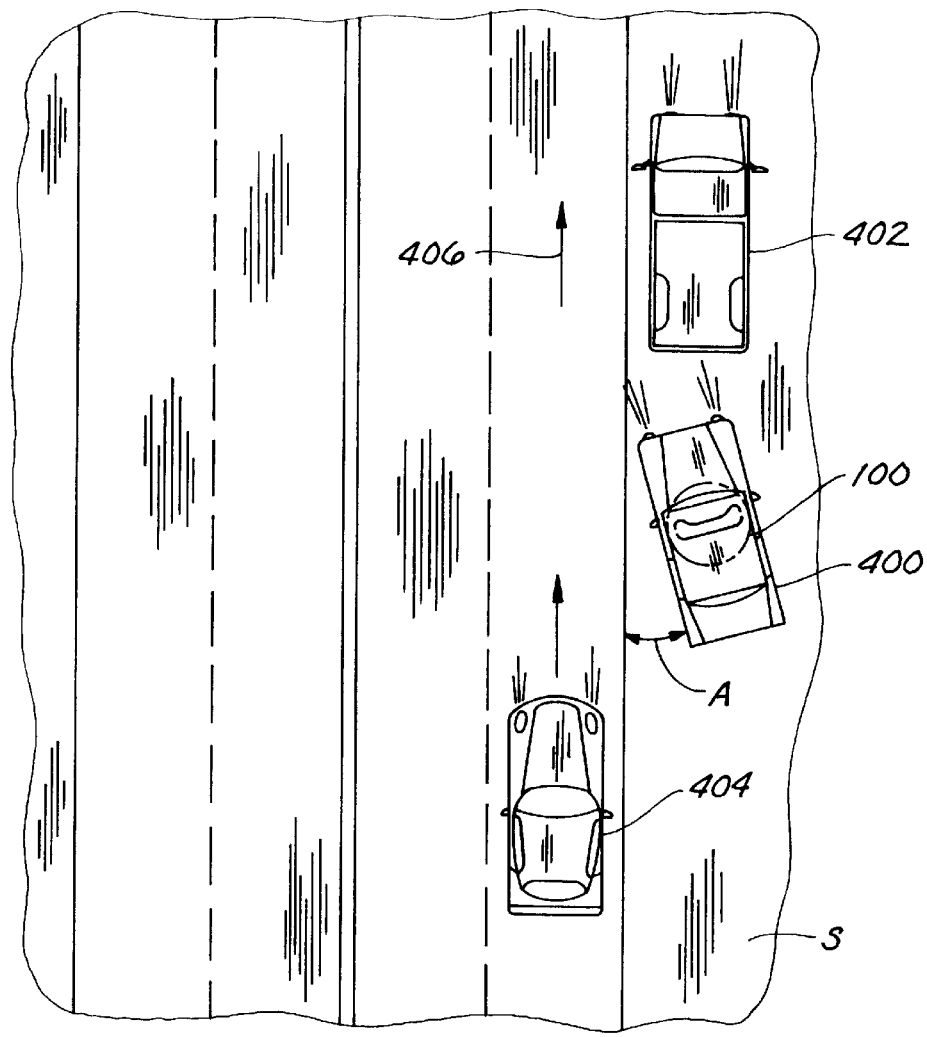
FIGS. 17A and 17B illustrate a top plan view of a vehicle and light bar in the fend off position.
Figure 17B:
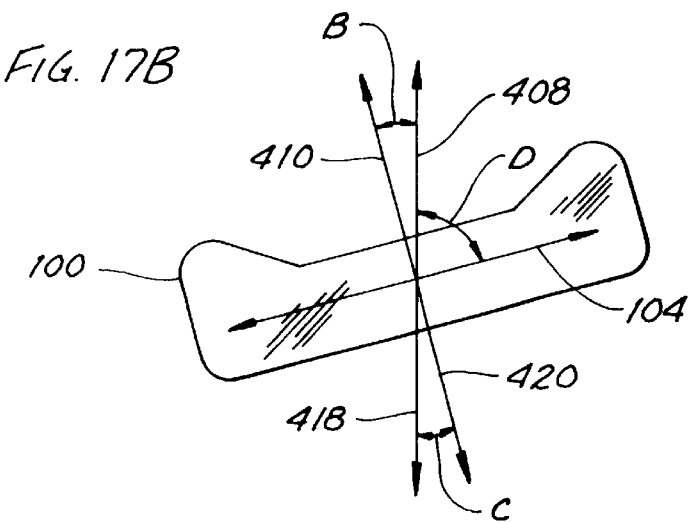

The fend off position can best be understood by referring to FIGS. 17A and 17B. Frequently, policemen and fireman will park a vehicle 400 on a shoulder S of a road in a fend off position to protect another vehicle 402 from oncoming traffic 404. In the fend off position, the vehicle 400 is angled slightly relative to the direction of flow of the traffic. The fend off position is a safety position and is used to place the engine of vehicle 400 between the occupants of vehicle 402 and the occupants of vehicle 400. The fend off position is also used as a safety position to place the vehicle 400 at an angle toward (or away from) the curb so that the vehicle is propelled away from vehicle 402 in the event that vehicle 400 is rear-ended by another vehicle. For example, an angle A between the vehicle and the direction of traffic 406 may be about 10° or less or may be 85° or more. According to one aspect of the invention, the fixtures of the light bar 100 can be similarly aimed in a direction 408 which is at an angle B of about 10° to 85° with respect to a forward direction 410 of the light bar 100 and of the vehicle 400 so that the fixtures continue to illuminate the vehicle 402 in front of vehicle 400 and further illuminate traffic approaching from the front of the vehicle. In addition, the fixtures illuminating the rear sector of light bar 100 are also aimed in a direction 418 which is at an angle C of about 10° or less or 85° or more with respect to the rearward direction 420 of the light bar 100 and of the vehicle 400 so that the fixtures continue to illuminate and provide emergency warning signals to vehicles approaching from the rear. In general, each fixture which is placed in a fend off position may comprise a first rotating or oscillating light source having a device (magnet 320 and sensors 322) for selectively positioning the first light source at a fixed position to provide a beam of light at an angle D of about 10° to 80° with the elongate axis 104 whereby the first light source in the fixed position is selectively positioned in a fend off position to illuminate a roadway when the emergency vehicle is at a fend off angle relative to the roadway.

As noted above and shown in FIG. 17B, the fend off position can be used for both forward and rearward facing transient light fixtures. In addition, the transient lights can be operated such that the forward fend off lights are used as takedown lights and are constantly illuminated whereas the rearward fend off lights can be flashed to warn oncoming vehicles.

It is also contemplated that the light bar 100 may include a first oscillating light fixture in front row 142, front center row 144 or rear center row 146 which faces forward and provides a selectively fixed beam of light directed toward positions in the front sector of the vehicle at the angle D of about 10° to 80° with the elongate axis 104. As a result, this first light fixture in the selectively fixed position is selectively positioned to illuminate the roadway toward the front of the vehicle when the emergency vehicle is at a fend off angle relative to the roadway. Further, the light bar 100 may have a second rotating or oscillating light source having a Hall sensor and magnet for selectively positioning the light source at a fixed position to provide a beam of light directed toward the rear of the vehicle at an angle of about 10° to 80° with the elongate axis 104 so that the second light source in the fixed position is selectively positioned to illuminate the roadway toward the rear of the vehicle when the emergency vehicle is at a fend off angle relative to the roadway. Alternatively, if the vehicle is positioned in a corresponding fend off angle such that the front of the vehicle is farther from the roadway than the rear of the vehicle (e.g., angle A would be negative), then the light bar of the invention would be configured to position its lights in a corresponding fend off position.

Figure 9A:
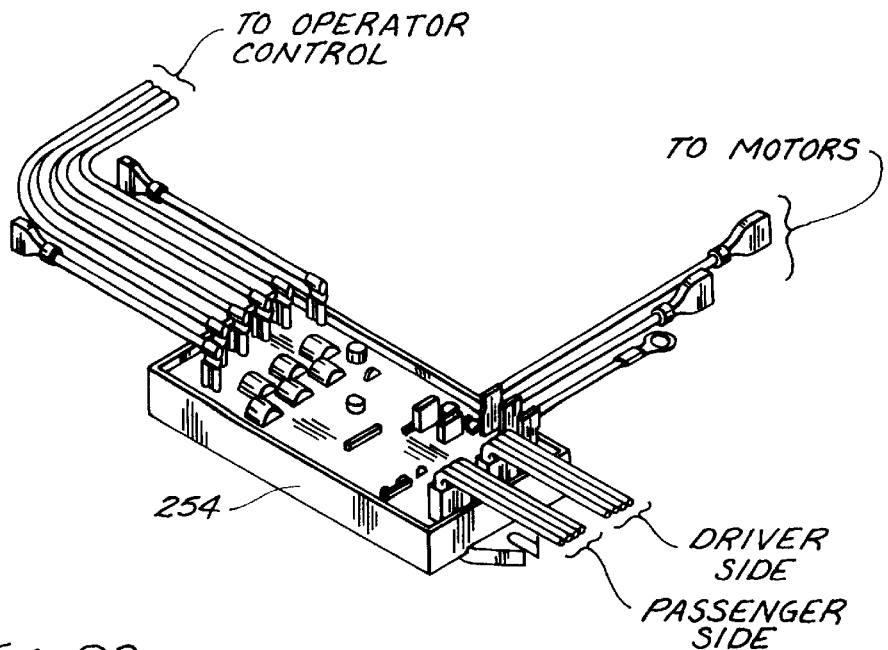
FIGS. 9A and 9B are schematic and block diagrams of the electrical circuitry of one preferred embodiment of the light bar according to the invention.
Figure 9B:
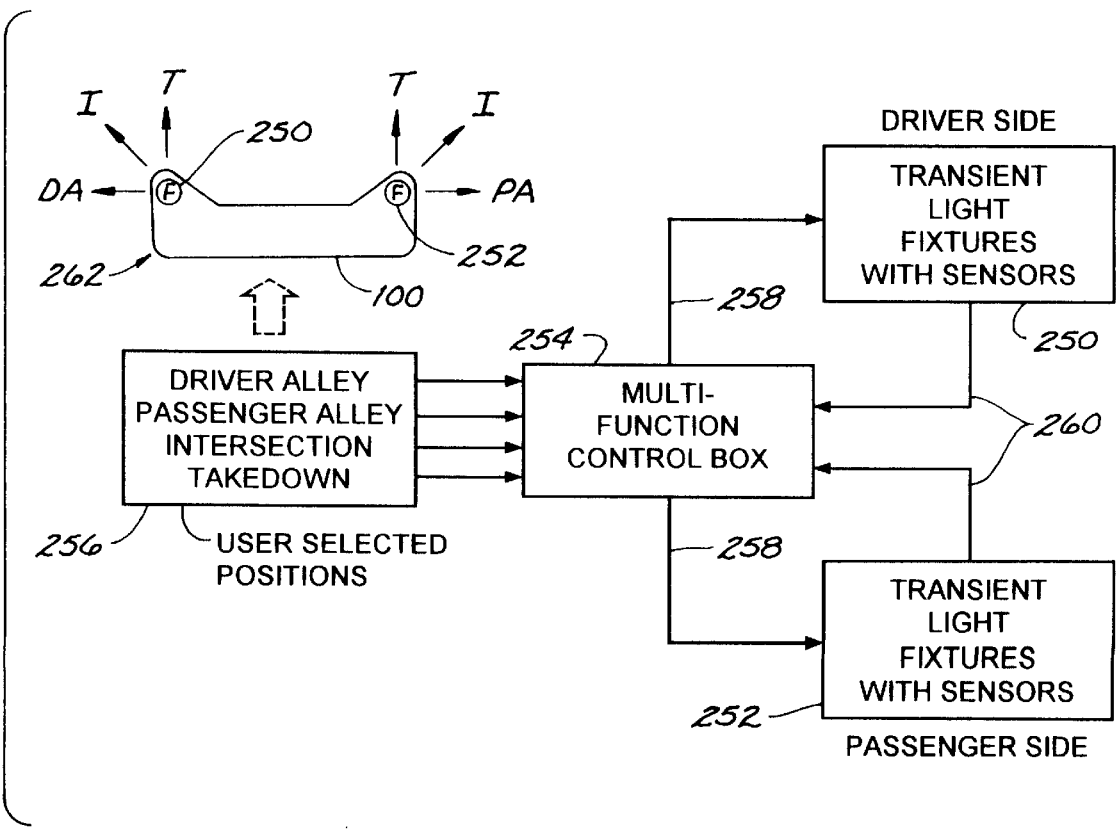

FIGS. 9A and 9B illustrate a multi-functional control system for coordinating operation of several light fixtures of the light bar. For example, the light bar 100 may include a driver side first transient light fixture 250, such as fixture 194 in FIG. 10 having a first mode in which the first light fixture 250 rotates or oscillates and having a second mode in which the first light fixture 250 is selectively positioned at a fixed position. The light bar 100 may also include a second transient light fixture 252 having a first mode in which the second light fixture 252 rotates or oscillates and having a second mode in which the second light fixture is selectively positioned at a fixed position. As a result, FIGS. 9A and 9B illustrate a single controller for controlling operation and coordinating modes of operation of the first and second light fixtures 250, 252.

More particularly, a multifunction control box 254 allows the light bar 100 of the invention to perform four different functions: driver alley illumination; passenger alley illumination; intersection illumination; and takedown illumination. Generally, an operator would have a control panel 256 including a plurality of switches or keys which are labeled to allow the operator to select the particular function desired. A microprocessor (not shown) within the multifunction control box drives two or more transient light fixtures with sensors 250 via lines 258. The sensors provide feedback via lines 260 indicating the position of the fixtures. This feedback may be as simple as a hall sensor detecting magnets indicating positions of the fixtures or may include an encoder which monitors fixture position and provides a position signal via lines 260. The microprocessor operates the motors causing the movement of the transient fixtures until the feedback indicates that the fixtures are in the selected position.

For example, if the operator selects TAKEDOWN on the control panel 256, the microprocessor of the control box 254 would rotate fixtures 250, 252 until they were in position to illuminate a position T as indicated by the schematic drawing 262 of the light bar 100. Similarly, if the operator selects INTERSECTION on the control panel 256, the microprocessor of the control box 254 would rotate fixtures 250, 252 until they were in position to illuminate a position I as indicated by the schematic drawing 262 of the light bar 100. Similarly, if the operator selects DRIVER ALLEY on the control panel 256, the microprocessor of the control box 254 would rotate driver fixture 250 until it was in position to illuminate a position DA as indicated by the schematic drawing 262 of the light bar 100. Similarly, if the operator selects PASS ALLEY on the control panel 256, the microprocessor of the control box 254 would rotate driver fixture 250 until it was in position to illuminate a position PA as indicated by the schematic drawing 262 of the light bar 100.

In one preferred embodiment, the controller 254 permits the operator to slowly or quickly rotate or oscillate any transient light sources to "slew" the light sources into a fend off or other position. In other words, the vehicle operator can activate the fend off lights by depressing a button which slowly rotates the position of the transient lights to move them to the right or left until they reach the position desired by the operator. In this embodiment, the light bar 100 would have a first transient light source on the body portion having a first mode in which the first light source rotates or oscillates in response to operator control and having a second mode in which the first light source is selectively positioned at a fixed position by the operator. Additionally, the light bar could also have a second transient light source on the body portion having a first mode in which the second light source rotates or oscillates in response to operator control and having a second mode in which the second light source is selectively positioned at a fixed position by the operator. The single controller 250 controls rotation or oscillation of the first and second light sources and selectively, simultaneously positions the first and second light sources in the fend off position defined by an operator. The first light source may have a device as illustrated herein for selectively positioning the first light source at a position selected by the operator to provide a beam of light at an angle of at least 5° and not more than 85° with the direction of travel of the vehicle whereby the operator controls rotation or oscillation of the first light source until it is in a fend off position to illuminate a roadway when the emergency vehicle is at a fend off angle relative to the roadway. This "slewing" feature may also be used to position lights in other positions, such as to illuminate alleys.

Referring to FIG. 7A, in one aspect of the invention, it is contemplated that the light bar 100 may be provided with fixtures which illuminate zones which cross over each other. For example, light bar 100 may include a first fixed or transient light source, such as strobe 500 having a first zone of illumination as defined by arrows 502. The strobe 500 is positioned on a right (passenger) side of a central axis 504 of the light bar 100 so that the first zone 502 illuminates positions on the left (driver) side of the light bar 100. In addition, the light bar 100 is provided with a second fixed or transient light source such as strobe 508 having a second zone of illumination as defined by arrows 510. The second strobe 508 is positioned on a left (driver) side of the central axis 504 of the light bar 100 so that the second zone 510 illuminates positions on the right (passenger) side of the vehicle. As shown in FIG. 7A, the strobes 500 and 508 are positioned in the intermediate layer 122 and in the first row 142 whereas forward facing strobes 501 are positioned in the lower layer 118. However, it is contemplated that the forward facing strobes and/or the cross over fixtures may be positioned in any layer and in any row.

FIG. 7B illustrates another preferred embodiment of cross over strobes wherein the cross over strobe 500 is mounted immediately over side facing strobe 503. As illustrated in FIG. 7B, strobe 503 is positioned in the lower layer 118 whereas the cross over strobe is in the intermediate layer 122. The forward facing strobe 503 may be mounted directly to the lower lens or to a mounting plate MP which is supported in a substantially horizontal position by frame 154. Preferably, the cross over strobe 500 is bolted to the mounting plate MP. Although light bars tend to have symmetrical layouts about axis 504, it is contemplated that the fixtures on the right side of the bar may be differently configured than those on the left side of the bar. For example, a bar may have the strobe configuration as illustrated in FIG. 7A on its left side and the strobe configuration as illustrated in FIG. 7B on its right side.

The strobes 500 and 508 are fixtures aimed at paths which cross each other thus the label cross over strobes. In particular, dashed line 512 indicates the direction at which strobe 500 is aimed and dashed line 514 indicates the direction at which strobe 508 is aimed. Note that both of these directions 512 and 514 intersect and cross each other and cross the central axis 504 of the light bar 100. One reason the light bar 100 of the invention accommodates cross over strobes is the extensions 108 within each of the strobes is located. As shown in FIG. 7, the strobes 500 and 508 can be positioned so that they are essentially parallel to the lens portion of the light bar 100 thus which is immediately in front of the strobes, minimizing reflection and maximizing transmittance of the light through the lens portion. It is contemplated that the angle D between the central axis 504 and the aimed direction 512, 514 of the cross over strobes would be at least 10° and not more than 75°. As illustrated in FIG. 7, the cross over strobes 500, 508 are preferably aimed at an angle of approximately 45° with the central axis 504.

Figure 11:
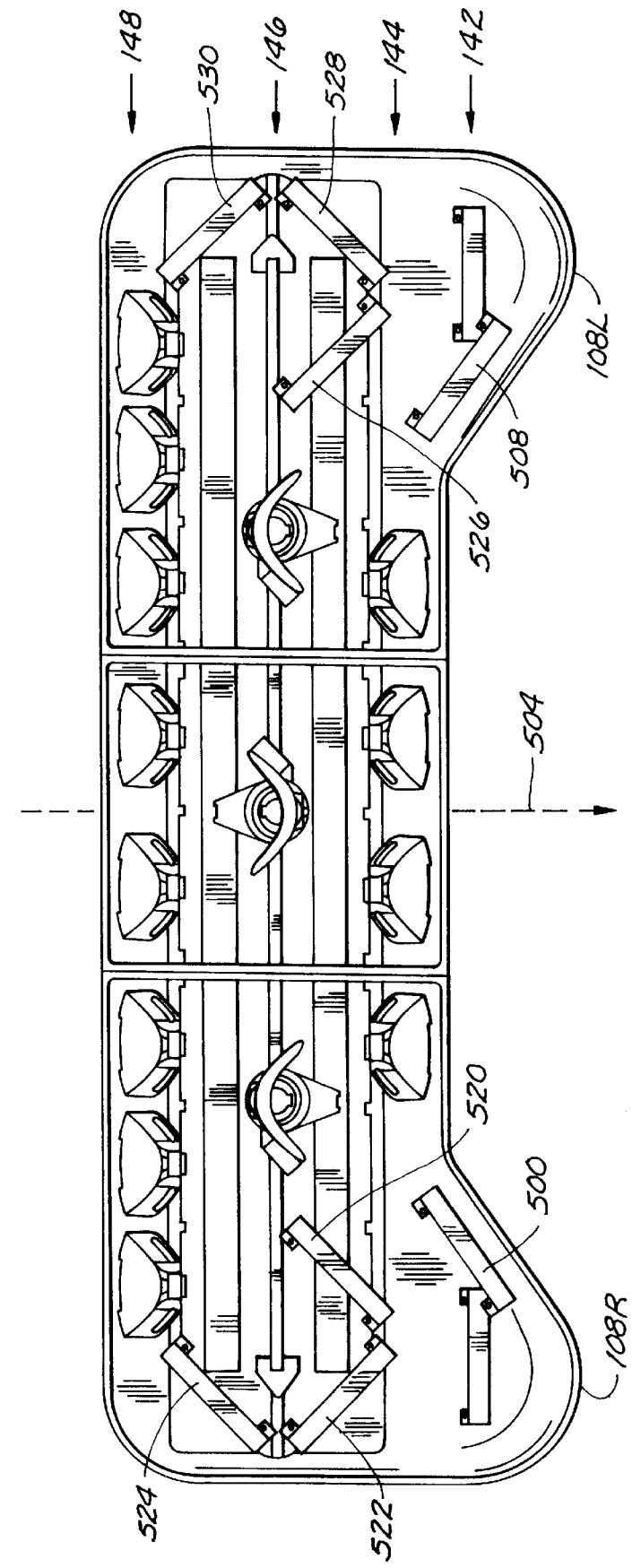
FIG. 11 is a top plan view of one preferred embodiment of a light bar according to the invention showing three (3) strobes covering 270° mounted within each of the longitudinal, forwardly projecting extensions.

Turning to FIG. 11, it is also contemplated that additional strobes may be mounted in the upper layer 130 to provide 270° of strobe coverage. For example, strobes 520, 522 and 524 on the right (passenger) side are positioned perpendicular to each other. Similarly, strobes 526, 528 and 530 on the left (driver) side of the light bar 100 are positioned perpendicular to each other. In this configuration, strobes 520 and 526 form cross over strobes with respect to each other. Strobe 520 constitutes a first fixed light source having a first zone of illumination. Since the strobe 520 is positioned on a right side of the central axis 504 of the light bar, its zone of illumination illuminates positions on the left side of the light bar. Strobe 522 constitutes a second fixed light source having a second zone of illumination. Strobe 522 is positioned contiguous to and perpendicular to the strobe 520 so that the zone of illumination of strobe 522 illuminates positions on the right side of the light bar 100. Strobe 524 constitutes a third fixed light source having a third zone of illumination. Strobe 524 is positioned contiguous to and perpendicular to the strobe 522. Strobe 524 is positioned opposite to and parallel to strobe 520 so that the strobe 524 illuminates a zone which includes positions on the right side of the light bar. Similarly, strobes 526, 528 and 530 are arranged in a corresponding manner. Although FIG. 11 illustrates strobes 520–530 in the upper layer 130, it is contemplated that the strobes may be any fixture including a transient light source positioned in any layer and/or positioned within the extensions 108.

It is also contemplated that the light bar 100 according to the invention may include a control responsive to and receiving a status signal so that the control would cause a change in the light signal provided by the light by such as by controlling the number of operating emergency light fixtures or the light pattern generated by the fixtures as a function of the status of the vehicle as represented by the received status signal. For example, the status may be speed in which case the status signal would be a tachometer (engine rpm) or vehicle speed signal representing the vehicle speed. Alternatively, the status of the vehicle may be acceleration, brake position or braking rate, turn signal position or transmission position. In such cases, the status signal would be speed signal, an acceleration signal, a signal indicating brake position or braking rate, a signal indicating the turn signal switch position or a signal indicating the gear of the transmission, respectively.

In general, it is contemplated that the controller may have one or more inputs (speed inputs, tachometer inputs, brake inputs, etc.) which indicate a status of the vehicle and which would be used to modify the operation of the light bar in some way, such as by changing the light signal pattern it produces, by changing the particular fixtures that are operating, by changing the rate of movement of the fixtures, by changing the flashing rate, by changing light intensity or by changing some other operating parameter of the light bar and/or its fixtures. Preferably, status signals which indicate increased need for safety, such as an increasing speed signal or a braking signal, would result in increased visibility of the light bar by increasing the number of operating fixtures, the flashing rate and the intensity. For example, brake input signals could increase the intensity and flashing rate of both the intersection lighting and the rear lighting as the brake is applied. The reasoning is that an emergency vehicle braking may be trying to avoid another vehicle which is turning into the emergency vehicle's path, or the braking indicates that the emergency vehicle is turning, both of which would call for more intense intersection light action. Additionally, when the emergency vehicle is braking hard, it needs to warn vehicles following it.

In one preferred embodiment, depressing or releasing the brake pedal would cause a change in emergency lighting such as a higher flashing rate or faster rotating speed for transient fixtures or would illuminate intersection lighting or illuminate a dual mode when two or more patterns or signals are simultaneously generated. Alternatively, placing the transmission in park or reverse would cause the emergency lighting to assume a fend off position and turn off a siren or illuminate a traffic directing signal in the light bar. Placing the transmission in park would also turn off any intersection lighting or any sirens. Alternatively, sudden acceleration or deceleration would cause the emergency pattern to change in speed or intensity.

Figure 12:
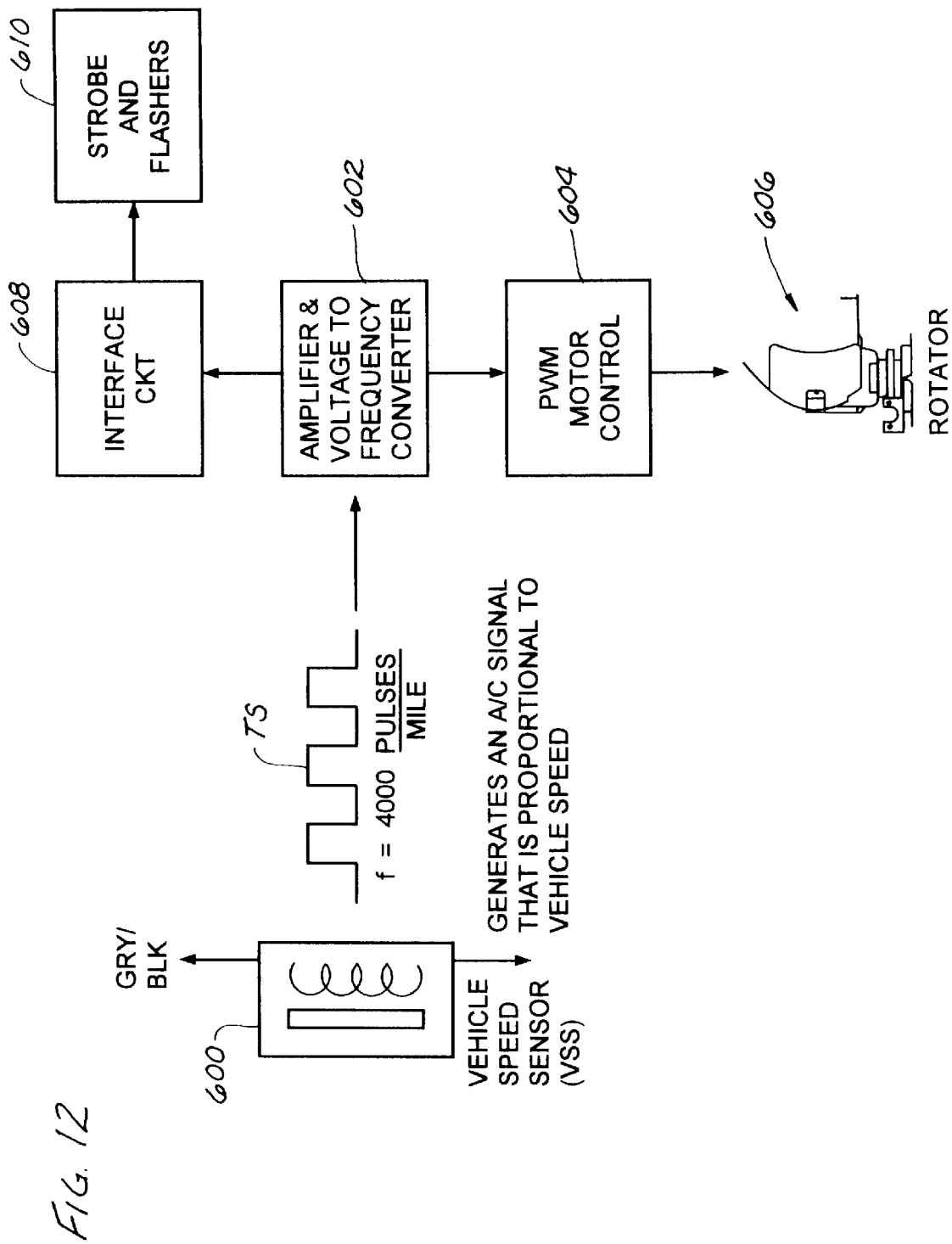
FIG. 12 is a diagram in schematic and block form of the electrical circuitry of one preferred embodiment of the light bar according to the invention including speed sensitive circuitry.
Figure 13:
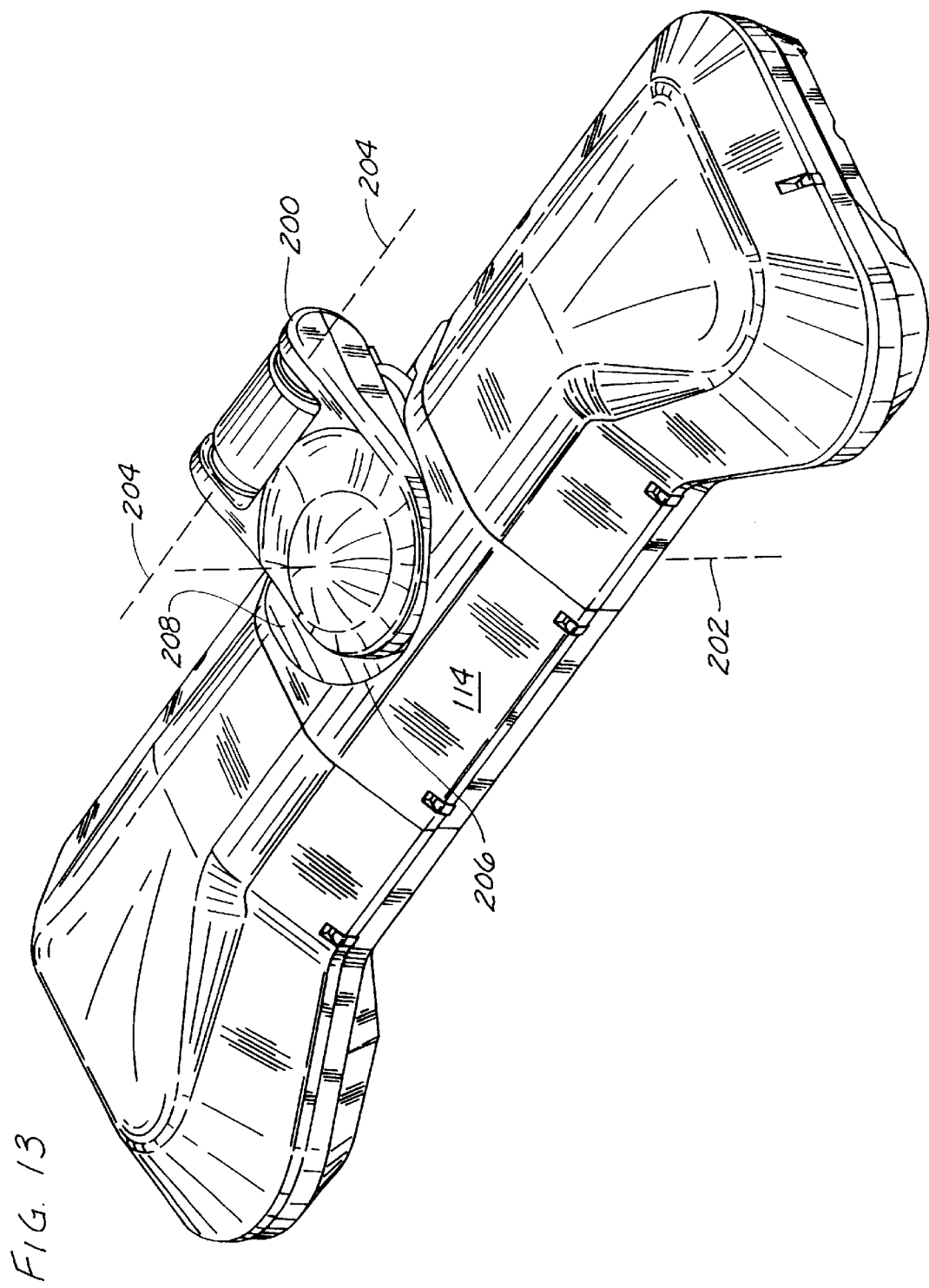
FIG. 13 is a perspective view of one preferred embodiment of a light bar according to the invention showing only the lens portion in combination with a nested spot light.
Figure 14:
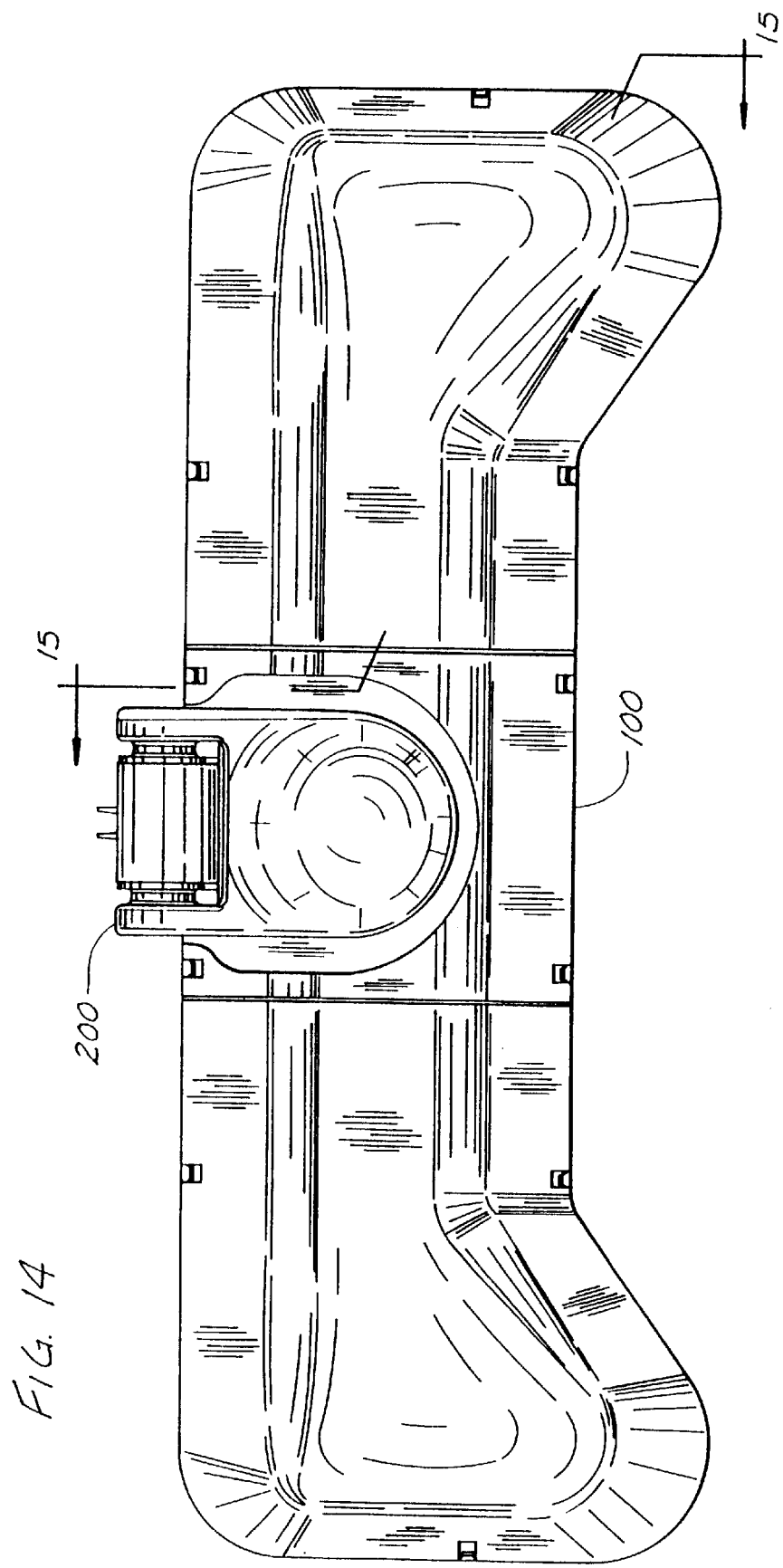
FIG. 14 is a top plan view of one preferred embodiment of a light bar according to the invention showing only the lens portion in combination with a nested spot light.

In particular, referring to FIG. 12, a speed signal TS, such as a tachometer signal, may be generated by a vehicle speed sensor 600 or may be generated by other electronic equipment on the vehicle itself. The speed signal TS would be provided to an amplifier and voltage to frequency converter 602 which would convert the speed signal into a signal representative of a frequency corresponding to the speed of the vehicle. This frequency signal may be provided to a pulse width modulated motor control 604 which pulses would operate a variable speed motor rotating a fixture 606. As a result, the rotator would rotate at a speed which corresponds to the speed of the vehicle. Alternatively, the frequency signal may be provided to an interface circuit 608 which fires strobes and/or transient or fixed flashers 610 so that the strobes and flashers may be fired at a frequency which corresponds to the vehicle speed. Those skilled in the art will readily recognize various correspondences between the vehicle speed and the speed of rotation or firing of the strobes and flashers. For example, it is contemplated that the strobes and flashers may fire at a faster speed when the vehicle begins to slow down to prevent rear end collisions. Alternatively, as the vehicle slows, the speed of the rotator 606 may increase to provide a more transient signal which would alert observers. It is also contemplated that the rotators may be rotated in a particular pattern or that the strobes and flashers may be fired in a particular pattern depending on vehicle speed. In this configuration, the pattern itself or the cycle at which the pattern is repeated may be varied in response to variations in the speed of the vehicle.

In view of the above, it will be seen that the several objects of the invention are achieved and other advantageous results attained.

As various changes could be made in the above constructions and products without departing from the scope of the invention, it is intended that all matter contained in the above description and shown in the accompanying drawings shall be interpreted as illustrative and not in a limiting sense.

What is claimed is:

1. A light bar for mounting on an emergency vehicle to provide warning light signals, the light bar comprising:
    an elongate body portion having an elongate axis, said elongate body portion adapted to be mounted on the emergency vehicle so that the elongate axis is transverse to an axis coaxial with the direction of the travel of the emergency vehicle;
    at least three vertically spaced lighting layers, each layer having at least one emergency light source, the emergency light sources on each layer cooperating to provide a transient high intensity warning light signal 360° around the light bar; and
    at least four linear rows of emergency light sources as viewed from the top of the light bar, said rows being substantially parallel to the elongate axis, each said row having at least two emergency light sources, at least one row located in each of the layers and at least one layer having at least two rows, the emergency light sources in each row cooperate to provide a transient high intensity warning signal 360° around the light bar.

2. The light bar of claim 1 further comprising a substantially horizontal frame defining a middle layer and supporting emergency light sources in the middle layer, said frame further defining a lower layer below the middle layer and supporting emergency light sources in the lower layer, and said frame further defining an upper layer above the middle layer and supporting emergency light sources in the upper layer.

3. The light bar of claim 1 wherein each level has at least one rotating or oscillating emergency light and at least one level has at least one mirror positioned adjacent the rotating emergency light to reflect light beams generated by the rotating emergency light, and wherein at least one of the rows of at least one layer includes at least one filter for filtering the light beams and creating a multicolor pattern produced by the light bar.

4. The light bar of claim 1 further comprising first and second forwardly or rearwardly projecting extensions on each end of the elongate body portion and wherein at least three of the rows are located within the elongate body portion and wherein at least one of the rows are located within the extensions.

5. The light bar of claim 4 wherein the extensions are integral with the elongate body portion and further comprising a single lens section forming at least a part of the elongate body portion and at least a part of one of the extensions.

6. The light bar of claim 1 further comprising first and second forwardly or rearwardly projecting extensions on each end of the elongate body portion and wherein at least one of the rows are located within the extensions, the emergency light sources in each row cooperating to provide a transient high intensity warning signal to an observer positioned substantially in line with the rows.

7. The light bar of claim 1 further comprising:
a base portion which extends downwardly from each end of the elongate body portion, said base portion adapted to support the elongate body portion on the vehicle; and
two mounting devices, one at each end of the elongate body portion, each said mounting device adapted to interconnect the light bar and the emergency vehicle, each said base portion having a recess within which each of the mounting devices is positioned.

8. The light bar of claim 7 wherein the second layer includes a frame and wherein the mounting devices are adapted to engage the frame and engage the vehicle such that the light bar can be mounted on vehicle surfaces having various contours.

9. The light bar of claim 7 wherein the mounting device comprises a mounting bracket having a portion for engaging the frame and having pads for resting on the vehicle, a hook for engaging the vehicle and a bolt interconnecting the mounting bracket and the hook.

10. The light bar of claim 1 further comprising:
at least two vertically spaced lighting layers, each layer having at least one rotating or oscillating emergency light source, the rotating or oscillating emergency light source of one layer being immediately above the rotating or oscillating emergency light source of the other layer.

11. The light bar of claim 1 further comprising:
a retractable device nested within the elongate body portion.

12. The light bar of claim 11 wherein the device comprises a spot light which rotates about a vertical axis to provide a beam of light which illuminates positions to the right, in front of, to the left or behind the vehicle and wherein the spot light rotates about a horizontal axis to provide a beam of light which illuminates various horizontal positions.

13. The light bar of claim 11 wherein the device comprises a radar detector antenna or an infrared source.

14. The light bar for of claim 1 further comprising:
a first rotating or oscillating light source having a device for selectively positioning the first light source at a fixed position to provide a beam of light at an angle of about 5° to 85° with the elongate axis whereby the first light source in the fixed position is selectively positioned in a fend off position to illuminate a roadway when the emergency vehicle is at a fend off angle relative to the roadway.

15. The light bar of claim 14 wherein the first light source provides a beam of light directed toward the front of the vehicle at an angle of about 5° to 85° with the elongate axis so that the first light source in the fixed position is selectively positioned to continuously illuminate the roadway toward the front of the vehicle when the emergency vehicle is at a fend off angle relative to the roadway and further comprising a second rotating or oscillating light source having a device for selectively positioning the light source at a fixed position to provide a beam of light directed toward the rear of the vehicle at an angle of about 5° to 85° with the elongate axis so that the second light source in the fixed position is selectively positioned to provide a emergency warning signal to the roadway toward the rear of the vehicle when the emergency vehicle is at a fend off angle relative to the roadway.

16. The light bar of claim 15 further comprising first and second linear rows of light sources as viewed from the top of the light bar, the first light source being positioned within the first row and the second light source being positioned with the second row.

17. The light bar of claim 16 wherein the body portion comprises a elongate body portion having a elongate axis adapted to be mounted on the emergency vehicle so that the axis is transverse to the direction of the travel of the emergency vehicle and wherein the first and second linear rows of light sources are substantially parallel to the elongate axis.

18. The light bar of claim 15 further comprising first and second layers of light sources, the first light source being positioned within the first layer and the second light source being positioned with the second layer.

19. The light bar of claim 14 comprising a position sensor on the first light source for selectively positioning the first light source in the fend off position.

20. The light source of claim 14 further comprising a positioning device responsive to an operator for positioning the first light source in the fend off position.

21. The light source of claim 20 wherein the positioning device comprises a position sensing circuit including a Hall effect device for sensing the position of one or more magnets rotating or oscillating with the first light source.

22. The light source of claim 14 wherein the first light source has multiple fixed positions and further comprising a circuit responsive to the operator for selecting a fixed position at which the first light source is positioned.

23. The light bar of claim 1 further comprising:
a first transient light source having a first mode in which the first light source rotates or oscillates and having a second mode in which the first light source is selectively positioned at a fixed position;
a second transient light source having a first mode in which the second light source rotates or oscillates and having a second mode in which the second light source is selectively positioned at a fixed position; and
a single controller for controlling operation and coordinating modes of operation of the first and second light sources.

24. The light bar of claim 23 wherein the first light source has a device for selectively positioning the first light source at a fixed position to provide a beam of light at an angle of at least 5° and not more than 85° with the elongate axis whereby the first light source in the fixed position is selectively positioned in a fend off position to illuminate a roadway when the emergency vehicle is at a fend off angle relative to the roadway.

25. The light bar of claim 1 further comprising:
a first light source having a first zone of illumination, the first source positioned on a left side of a central axis of the light bar so that the first zone illuminates positions on the right side of the light bar; and a second light source having a second zone of illumination, the second source positioned on a right side of the central axis of the light bar so that the second zone illuminates positions on the left side of the vehicle.

26. The light bar of claim 25 wherein the first and second light sources each comprise a fixed strobe or halogen light aimed at an angle within a range of about 15°–75° relative to the central axis, further comprising first and second extensions on each end of the elongate body portion and wherein each of the strobe lights is located at least partially within one of the extensions.

27. The light bar of claim 1 further comprising:

a first light source having a first zone of illumination, the first source positioned on a left side of the central axis of the light bar so that the first zone illuminates positions on the right side of the light bar;

a second light source having a second zone of illumination, the second source positioned contiguous to and perpendicular to the first light source so that the second zone illuminates positions on the left side of the light bar; and a third light source having a third zone of illumination, the third source positioned contiguous to and perpendicular to the second light source, the third source positioned opposite to and parallel to the first light source, the third light source positioned so that the third zone illuminates positions on the left side of the light bar.

28. The light bar of claim 27 further comprising first and second projecting extensions on each end of the elongate body portion and wherein at least one of the sources are located in at least one of the extensions.

29. The light bar of claim 1 further comprising:

a control responsive to and receiving a status signal, said control controlling the number of operating emergency light sources, the light source positions, the light pattern or the flashing rate generated by the operating emergency light sources as a function of the status of the vehicle as represented by the received status signal.

30. A light bar for mounting on an emergency vehicle to provide warning light signals, the light bar comprising:

an elongate body portion having an elongate axis adapted to be mounted on the emergency vehicle so that the elongate axis is transverse to the direction of the travel of the emergency vehicle;

at least one vertically spaced lighting layers, each layer having at least one emergency light source, the emergency light sources on each layer cooperating to provide a transient high intensity warning light signal 360° around the light bar;

at least two linear rows of emergency light sources as viewed from the top of the light bar, said rows being substantially parallel to the elongate axis, each said row having at least two emergency light sources, at least one row located in each of the layers and at least one layer having at least two rows, the emergency light sources in each row cooperating to provide a transient high intensity warning signal 360° around the light bar, the emergency light sources in each row cooperating to provide a transient high intensity warning signal to an observer positioned substantially in line with the rows; and first and second forwardly or rearwardly projecting extensions on each end of the elongate body portion having at least two rows located within the extensions.

31. The light bar of claim 30 having at least two vertically spaced lighting layers, further comprising a horizontal frame within the elongate housing for supporting the emergency light sources and wherein the extensions project downwardly and have at one lighting layer of emergency light sources located below a horizontal plane defined by the frame.

32. The light bar of claim 31 wherein the extensions are integral with the elongate body member and further comprising a single lens section forming at least a part of the elongate body member and at least a part of one of the extensions.

33. A light bar for mounting on an emergency vehicle to provide warning light signals, the light bar comprising:

an elongate body portion having an elongate axis, said elongate body portion adapted to be mounted on the emergency vehicle so that the elongate axis is transverse to the direction of the travel of the emergency vehicle;

at least two vertically spaced lighting layers, each layer having at least one emergency light source, the emergency light sources on each layer cooperating to provide a transient high intensity warning light signal 360° around the light bar;

a base portion which extends downwardly from each end of the elongate body portion, said base portion adapted to support the elongate body portion on the vehicle; and two mounting devices, one at each end of the elongate body portion, each said mounting device adapted to interconnect the light bar and the emergency vehicle, each said base portion having a recess within which each of the mounting devices is positioned.

34. The light bar of claim 33 wherein the second layer includes a frame and wherein the mounting devices are adapted to engage the frame and engage the vehicle such that the light bar can be mounted on vehicle surfaces having various contours.

35. The light bar of claim 33 wherein the mounting device comprises a mounting bracket having a portion for engaging the frame and having pads for resting on the vehicle, a hook for engaging the vehicle and a bolt interconnecting the mounting bracket and the hook.

36. A light bar for mounting on an emergency vehicle to provide warning light signals, the light bar comprising:

an elongate body portion having an elongate axis adapted to be mounted on the emergency vehicle so that the axis is transverse to the direction of the travel of the emergency vehicle;

at least two vertically spaced lighting layers, each layer having at least one oscillating emergency light source, the oscillating emergency light source of one layer being immediately above the oscillating emergency light source of the other layer.

37. The light bar of claim 36 further comprising first and second forwardly projecting extensions on each end of the elongate body portion and wherein the oscillating sources are located in at least one of the extensions.

* * * * *